US008464451B2

(12) United States Patent
McRae

(10) Patent No.: US 8,464,451 B2
(45) Date of Patent: Jun. 18, 2013

(54) FIREARM SYSTEM FOR DATA ACQUISITION AND CONTROL

(76) Inventor: Michael William McRae, Fair Oaks, CA (US)

( * ) Notice: Subject to any disclaimer, the term of this patent is extended or adjusted under 35 U.S.C. 154(b) by 961 days.

(21) Appl. No.: 11/801,113

(22) Filed: May 7, 2007

(65) Prior Publication Data
US 2008/0039962 A1 Feb. 14, 2008

Related U.S. Application Data

(60) Provisional application No. 60/802,677, filed on May 23, 2006.

(51) Int. Cl.
*F41A 9/53* (2006.01)
*F41A 17/00* (2006.01)
*F41G 1/38* (2006.01)

(52) U.S. Cl.
USPC .............................. 42/1.01; 42/70.01; 42/122

(58) Field of Classification Search
USPC ............. 42/84, 122, 70.06–70.08, 1.01–1.05,
42/70.01; 89/41.03, 41.14, 41.15, 41.16,
89/41.17, 41.19
See application file for complete search history.

(56) References Cited

U.S. PATENT DOCUMENTS

| | | | | |
|---|---|---|---|---|
| 4,541,191 A | * | 9/1985 | Morris et al. | 42/1.01 |
| 5,026,158 A | * | 6/1991 | Golubic | 356/252 |
| 5,052,138 A | * | 10/1991 | Crain | 42/1.02 |
| 5,142,805 A | | 9/1992 | Horne et al. | |
| 5,272,828 A | * | 12/1993 | Petrick et al. | 42/84 |
| 5,402,678 A | * | 4/1995 | Fritz et al. | 73/167 |
| 5,555,662 A | * | 9/1996 | Teetzel | 42/115 |
| 5,566,486 A | * | 10/1996 | Brinkley | 42/1.02 |
| 5,799,432 A | * | 9/1998 | Wright et al. | 42/1.02 |
| 6,269,581 B1 | | 8/2001 | Groh | |
| 6,286,240 B1 | * | 9/2001 | Collins | 42/70.08 |
| 6,321,478 B1 | | 11/2001 | Klebes | |
| 6,412,207 B1 | * | 7/2002 | Crye et al. | 42/70.06 |

(Continued)

FOREIGN PATENT DOCUMENTS
DE 4022038 A1 * 1/1992

OTHER PUBLICATIONS
Burris Laser-Scope Product Guide.

*Primary Examiner* — Michael Carone
*Assistant Examiner* — Reginald Tillman, Jr.

(57) ABSTRACT

A microprocessor circuit that is used to monitor and control a firearm. The microprocessor circuit accomplishes this by monitoring various sensor & control inputs, and acting on these inputs to execute user defined functions. The microprocessor circuit can use the sensory input to determine firearm statistics. These statistics can include the number of times the firearm has been shot, the efficiency of the firearm automatic action, range-to-target, and etcetera. The firearm system can also use a combination of sensors to fabricate a bullet chronograph whereby the muzzle velocity of a cartridge can be determined. These statistics can be date-stamped and recorded into memory. Statistics from Law Enforcement firearms can be used for courtroom evidence and police reporting. These statistics can also be used for firearm maintenance and warranty repair. The microprocessor circuit can display the statistical data to the user via simple light emitting diodes, or sophisticated liquid crystal displays. Data can also be downloaded to a computer docking station as well. The microprocessor circuit can also display the information within the optics of a riflescope. When used in conjunction with a laser range finder sensor, the microprocessor circuit can adjust the electronic cross-hairs (reticle) to compensate for the bullet trajectory.

4 Claims, 13 Drawing Sheets

U.S. PATENT DOCUMENTS

| | | | |
|---|---|---|---|
| 6,477,633 B1 * | 11/2002 | Grimmett | 711/206 |
| 6,483,698 B1 * | 11/2002 | Loh | 361/679.41 |
| 6,523,296 B1 | 2/2003 | Constant et al. | |
| 6,590,386 B1 * | 7/2003 | Williams | 324/178 |
| 6,615,814 B1 * | 9/2003 | Rice et al. | 124/71 |
| 6,643,968 B2 * | 11/2003 | Glock | 42/1.02 |
| 6,813,025 B2 * | 11/2004 | Edwards | 356/422 |
| 6,823,621 B2 * | 11/2004 | Gotfried | 42/70.06 |
| 6,941,693 B2 * | 9/2005 | Rice et al. | 42/71.01 |
| 7,654,029 B2 * | 2/2010 | Peters et al. | 42/111 |
| 7,690,145 B2 * | 4/2010 | Peters et al. | 42/111 |
| 7,699,683 B2 * | 4/2010 | Caspi | 446/456 |
| 8,046,946 B2 * | 11/2011 | Packer et al. | 42/1.01 |
| 2002/0132511 A1 * | 9/2002 | Groebe et al. | 439/357 |
| 2003/0061753 A1 * | 4/2003 | Glock | 42/1.02 |
| 2005/0198885 A1 * | 9/2005 | Staley, III | 42/142 |

\* cited by examiner

FIREARM SYSTEM FOR DATA ACQUISITION AND CONTROL

CROSS-REFERENCE TO RELATED APPLICATIONS

This application claims the benefit of Provisional Patent Application;
Ser. No.: 60/802,677
Filed: May 23, 2006

FEDERALLY SPONSORED RESEARCH

Not Applicable

SEQUENCE LISTING OR PROGRAM

Not Applicable

BACKGROUND OF THE INVENTION

1. Field of Invention

This invention relates to firearms; specifically to an electronic system for gathering firearm data, manipulating such data, displaying data to the user, receiving commands from the user, recording pertinent information to memory, and finally for controlling the firearm itself.

2. Description of Prior Art

Firearms are used for self-defense, hunting, marksmanship competition, law enforcement, and the military. Although the field of firearms is very mature, modern electronics now provide a way to expand the field of firearms even further.

In much the same way that a car's computer interfaces with the user; a firearm system can collect data associated with the firearm, perform calculations and decisions based on this data, provide feedback to the user, determine maintenance intervals, control the firearm, and save pertinent data to memory. There are many needs for a firearm system of this type.

For example, organizations that have multiple firearms (such as law enforcement agencies and the military) need a system to help manage their fleet of firearms. This system would provide statistical information on the operation and use of each firearm. For example, the system could gather information as to the mechanical operation of the firearm such as the time it takes the automatic action to operate, the number of times the firearm has been shot, and so forth. This information can be used to determine if the firearm needs repair, maintenance & cleaning, or even if the firearm has exceeded its life expectancy. Additionally, the firearm system can time-stamp these events as they are recorded into memory. In this manner an officer can not only determine how many shots were fired from his/her weapon, but the precise time that each shot took place. This would be excellent information for police reports and courtroom evidence. Lastly, as each Officer completes his shift and turns in his/her firearm, they can put their firearm into a docking station. This docking station can automatically charge the battery of the firearm system, as well as download the individually serialized firearm data. Certain software flags can also be identified in the docking station. For example, an Officer's Supervisor can automatically be notified if the firearm has been discharged.

Another need exists to notify the user as to the status of the firearm. One does not have the ability to peer inside of a firearm with x-ray vision and determine if the firearm has an unspent cartridge in the chamber, is cocked, and has the safety off. Time and again users pick up a firearm to shoot, only to squeeze the trigger and find that nothing happens. This is particularly bad when one's life is at stake. Conversely, users thinking that a firearm is not ready to fire, pick up a firearm and cause an accidental discharge. Therefore a serious need exists for the user to be able to instantly determine the "ready status" of a firearm. For example, if the firearm is not ready to be fired (i.e. no round in the chamber and/or safety is engaged), then the firearm system will notify the user that the firearm is currently not able to be fired. Conversely, if the firearm is ready to be fired (i.e. round in the chamber, cocked, and safety disengaged), then the firearm system will notify the user that the firearm is ready. Additionally, the firearm system could notify the user as to how many rounds are available in the firearm. This is important as in a gunfight it is not uncommon for the user to loose count of how many rounds they have remaining in the weapon.

Still another need exists to conveniently determine the muzzle velocity of the cartridges that are being fired. This is especially important when developing custom ammunition loads. Traditionally this information is obtained by an external piece of equipment called a bullet chronograph. The user fires the gun through the chronograph to measure and obtain muzzle velocity. However this requires additional equipment to be purchased and set-up by the user, and is not conveniently located in or on the firearm itself. Therefore a need exists to have a firearm with a built-in bullet chronograph.

Yet another need exists to automatically determine bullet-drop-compensation (BDC). When the user is shooting at a target of an unknown distance, the user needs to know what the range is so that the user can aim high or low to compensate for the bullet trajectory. This need is met by the firearm system having a built-in range finder and/or bullet-drop-compensation. This will then give the ranging information that the user needs to adjust their aiming, or the system will use this ranging information (along with other information from the firearm) to automatically adjust the sights on the firearm. Additionally, the system could have an inclinometer, manometer, and other sensors so that other variables can be factored into the bullet-compensation.

A need also exists for a firearm system to have wireless communication with other sensors and or people. For example, a rifle scope image might need to be transmitted to a command-and-control authority. Having seen the situation through the "shooter's eyes", the authority could then send a message or signal back to the shooter to give him/her authorization to engage the target. As a function of how the firearm system is implemented, command-and-control would also be able to remotely control certain aspects of the firearm, such as the firing pin. Lastly, there may also be a need for the firearm system to wirelessly communicate with other sensors in order to obtain, GPS elevation and other sensory variables that can be used to calculate bullet-compensations. Therefore, a need exists for a firearm system that can communicate "data and commands" as described above.

A similar need exists to calculate bullet-drop-compensation on legacy firearms that do not have a firearm system. This need can be addressed by incorporating the firearm system into a hand-held optical rangefinder (or binoculars with rangefinder). In this manner the firearm system can take the range-to-target information and produce a numeric readout that will be used for trajectory compensation. The shooter will then use this information to aim high or low as needed to hit the target. Alternatively the firearm system can be entirely self-contained in a rifle scope. In this manner the system can adjust the scope reticle (cross hairs) and or provide a numeric compensation readout. In either configuration, the device can be programmed with ballistic tables for multiple types of ammunitions. In this manner the user can simply select the ammunitions cartridge of choice that will be used for the bullet compensation.

The above describes a comprehensive firearm system that addresses unsolved needs, and resolves unrecognized problems. The current art has attempted to make advancements in this endeavor as follows:

U.S. Pat. No. 6,516,699-B2 (Sammut et al) describes a customized scope reticle and a method for interpreting ("calibrating") the fixed reticle positions. The reticle has primary vertical and primary horizontal cross-hairs, and a plurality of secondary cross-hairs. The fixed reticle is permanently etched onto the glass optics of the rifle scope. The primary cross-hairs of the scope are adjusted or "zeroed" for a specific distance (such as 100 yards). However, the secondary cross-hairs are generic in nature and must be interpreted as to the actual points of impact they represent. This interpretation is called "calibrating" the reticle. Calibration can be manual, or automatic. A manual calibration involves locating a pre-printed ballistics table that most closely matches the characteristics of the rifle & cartridge combination being used (see FIG. 5). A mental cross-correlation is then made between this ballistics table and the fixed reticle (see FIG. 7). An automatic calibration involves using a computer program to generate and print a ballistics table that more closely matches the characteristics of the rifle & cartridge combination being used, and the field conditions encountered. This printed table is then used to make the mental interpretations as detailed above for the manual calibration. Once the reticle is mentally calibrated, the secondary cross-hairs can then be used for selecting known points of impact that do not coincide with the "zeroed" position of the primary cross-hairs. This is important as the target is rarely at the "zeroed" position of the scope. The reticle also contains a graduated scale for subjectively predicting the distance to a target of estimable size. This is a common technique for estimating the distance to target. Sammut understands that it is impractical to carry a computer to the field for printing automatic calibration tables, therefore the computer program can also be used on a personal digital assistant (PDA) for portability and convenience. This invention is an interesting combination of reticle spatial relationships, and printed ballistic tables. However, this invention suffers from the following limitations:

Does not take advantage of electronics embedded into the rifle scope.

Is unable to measure the actual bullet velocity (no bullet chronograph).

Cannot measure the actual distance to target.

Is unable to determine actual bullet drop compensations due to missing chronograph.

Requires equipment outside of the rifle & scope combination in order to understand the reticle spatial relationships.

The reticle is fixed and unable to be electronically adjusted.

Requires the user to perform confusing mental gymnastics in order to mentally superimpose the ballistics table onto the fixed reticle.

Another example; U.S. Pat. No. 6,269,581 (Groh) describes an electronic rifle scope with a built-in range finder. Once the range-to-target is obtained, the on-board microprocessor calculates the required bullet-drop-compensation, and adjusts a compensation cross-hair [It should understood that this is a very difficult patent to understand, and arguably does not contain adequate information for one skilled in the art to understand and build such an item. For example, a laser rangefinder is preferred and cited in the claims, but not shown on the drawings. A microprocessor circuit is required but also not shown. The critical viewfinder window (part #26) is discussed and even numbered, but also not shown in the drawings. The reader is left to make assumptions to fill the gaps for power, memory or type of memory, microprocessor programming, and etcetera. An important point is that one is left to assume the number of eye pieces as required to view the different display embodiments.] Continuing; this is a curious invention, but it is lacking any interaction with the firearm itself. For example, this invention does not have a built-in bullet-chronograph and therefore the use must either test the ammunition separately in a traditional bullet chronograph, or make an assumption as to what the bullet velocity will be for the particular cartridge and firearm being used. The device also does not contain a data ort for communication with a computer. Another important shortcoming is how the numeric displays viewed. The numeric display is either mounted to the device housing and is viewed adjacent to the eyepiece, or the numeric display is mounted underneath the viewfinder window. One is left to imagine just how the display can be seen if it is mounted underneath the viewfinder window. In either case however, the numeric display is obviously not in direct alignment with the scope optics. This presents obvious challenges for the user.

U.S. Pat. No. 6,321,478-B1 (Klebes) describes an electronic ignition system for a firearm. This includes a fingerprint security access, loaded chamber sensor, and a grip sensor. The ignition system will only allow the weapon to be discharged upon proper security access, indication of a loaded chamber, grip sensor activation, and a proper electrical charge on the ignition system. This invention also has a display for indicating the status of the ignition system to the user. However, this invention is solely concerned with the security access of the firearm, and the electronic ignition of the ammunition cartridges. This invention fails to provide other useful feedback to the user such as the number of rounds left in the magazine, chronographs readings, maintenance intervals, and the time stamp recording of pertinent events. Additionally, this ignition system is not applicable to traditional mechanically fired firearms.

US pat. No. 2005/0198885 A1 (Staley) describes an aiming device that incorporates three sites and one rangefinder. The first site is used for rifle ammunition. The reticle of which is permanently etched onto the scope optics, and is only visible when illuminated with electronics. The second site is for the rifle-mounted grenade launcher. And the third site is a backup in case the electronics fail on the first site. Although an interesting invention, this device is not capable of having a dynamically adjusted reticle, as the reticle is permanently etched on the device optics. Further, a dynamic reticle would allow the same site arrangement to be used for both the rifle ammunition and the grenade launcher as well. This would eliminate the need for the second, site. Additionally, a robust invention that is still operable even when power is lost would eliminate the need for the backup site. Lastly, this invention has no interaction with the firearm whatsoever, and has no means for data communication. Therefore this invention is limited to only being an aiming device.

U.S. Pat. No. 6,523,296-B1 (Constant, et al) describes an electronic back-strap for a pistol. This back-strap provides easy accommodation for firearm electronics such as push buttons, display devices, and electronic circuitry. However this invention does not have a purpose or application other than providing a place to put the firearm electronics. The actual use of the electronics is not addressed by this invention.

U.S. Pat. No. 5,142,805 (Horne, et al) describes a novel invention that counts the number of rounds remaining in the firearm. One sensor is used to detect slide movement, and a second sensor is used to detect insertion of a magazine. When a magazine is inserted, the device assumes the magazine is fully populated. This information is conveyed to the user with a small electronic display. Each time the slide is moved, the device assumes that a cartridge has been spent, and therefore decreases the count by one. Although a clever device, it must assume that the magazine is full when it is inserted. This is not always the case and can cause false readings. Additionally, the count will be zero when the last live round is in the chamber. This is an obvious danger as a user may think the firearm is unloaded when it actually isn't.

U.S. Pat. Nos. 6,941,693-B2 & 6,615,814-B1 (Rice et al) describe an electronic firing mechanism for a pneumatic paintball gun. The electronic mechanism provides user selectable firing modes. For example, a single press of the trigger can provide semi-automatic, or full automatic burst mode with a selectable number of discharges per trigger press. The device can also be selected for specific dwell time intervals between discharges. In addition, the device can also record paint-ball gun related information to a "data carrier" memory. This includes temperature, rate of fire, pneumatic pressure, battery condition, and etcetera. The device can display this information to a local display on the paintball gun, or the data can be displayed on other equipment such as a computer, personal digital assistant (PDA), and etcetera. In order to display the information on other equipment, a communications link must be established between the two. This link can be either wired or wireless. Alternatively, the "data carrier" memory can be removed from the device and loaded into other equipment for display. This is an interesting device for paintball guns. However, this invention suffers from the following shortcomings:

- Is unable to provide continued operation of the paintball gun when the battery dies, or if the electronics otherwise fail.
- Is unable to determine if the paintball gun has a loaded chamber.
- Is unable to determine how many shots remain in the paintball gun.
- Is unable to determine if the paintball gun is cocked.
- Is unable to determine the position of the paintball gun safety mechanism.
- Is unable to provide the "Go/No-Go" ready status (loaded chamber, cocked, safety off) of the paintball gun.
- Is unable to measure the efficiency of the paintball gun mechanical action.
- Is unable to differentiate between operating the paintball gun mechanical action by hand, or by discharging the paintball gun.
- Is unable to combine the above information and interpret whether or not the paintball gun has been discharged.
- Is unable to differentiate between a "dry-fire" trigger-pull, and actually discharging the paintball gun.
- Is unable to determine with what velocity a paintball was discharged (no paintball chronograph).
- Is unable to differentiate between cleaning the paintball gun barrel, and taking a chronograph reading.
- Is unable to measure the distance to target.
- Is unable to combine the paintball velocity and distance to target information to calculate "paintball drop" compensation.
- Is unable to adjust the reticle on an optical scope to correspond with the "paintball drop" compensation.
- Is unable to cradle the paintball gun in a docking-station.
- Is unable to be remotely controlled by a "command and control" center.

The above has highlighted only a few of the specific needs of a firearm system. More applications, sensor inputs, and control features can be obtained from the following discussions.

OBJECTS AND ADVANTAGES

The objects and advantages of the invention are as follows:

a. To provide a firearm system that can measure the performance of the firearm action.
b. To provide a firearm system that can record when the firearm action was operated.
c. To provide a firearm system that can determine if the firearm automatic action was operated by hand, or if by the discharge of a cartridge.
d. To provide a firearm system that can inform the user when servicing and/or maintenance is needed.
e. To provide a firearm system that can detect firearm malfunctions, such as a "failure to feed".
f. To provide a firearm system that can determine when the last round was fired.
g. To provide a firearm system that can determine bullet velocity and/or acceleration (i.e. built-in chronograph).
h. To provide a firearm system with an integrated bullet-chronograph that can distinguish between cleaning the firearm barrel, and an actual discharge.
i. To provide a firearm system that can determine the range to a target.
j. To provide a firearm system that can use sensory data and/or pre-programmed tabular data to determine bullet-drop-compensations.
k. To provide a firearm system that can adjust the optical cross-hairs (recital) of a riflescope to accommodate for bullet-compensations.
l. To provide a firearm system that can determine if the chamber is loaded.
m. To provide a firearm system that can determine the number of rounds left in the magazine.
n. To provide a firearm system that can determine when a round is fired.
o. To provide a firearm system that can determine if the safety is engaged.
p. To provide a firearm system that can record the collected information into a database memory.
q. To provide a firearm system that can date and time stamp events as they happen.
r. To provide a firearm system that may require security access such as a password or electronic key.
s. To provide a firearm system whose collected information can be downloaded for other uses such as firearm performance statistics, or Police Reports involving an officer's firearm.
t. To provide a firearm system that supports the management of an armory of firearms such as those used in a Police Station.
u. To provide a firearm system that can display simple "ready status" information to the user such as a dual color LED (, red=no-go, green=go, flashing red=maintenance required).
v. To provide a firearm system that can display moderately complex information to the user such as shooting statistics.
w. To provide a firearm system that can display complex and real-time information to the user by means of superimposing this data into the optics of a firearm mounted riflescope, or hand held binoculars.

x. To provide a firearm system that is capable of transmitting the optical display information back to a central data collection point and/or decision maker.
y. To provide a firearm system that is capable of controlling, locking, or releasing firearm components; such as trigger activation and/or lock-out.
z. To provide a firearm system that (in most embodiments) will not render the firearm inoperable upon the system battery dying, or the system electronics otherwise failing.
aa. To provide a firearm system that avoids erroneous sensor detection.
bb. In short, to provide a comprehensive firearm system that can accept information from a plurality of sensors, determine firearm computations, determine firearm status & statistics, store information into memory, display information to a user, control specific functions of the firearm, provide remote decision maker observation and control, provide local user control, and provide an optional security access.

Further objects and advantages will become apparent from a consideration of the drawings and ensuing description.

SUMMARY

The invention consists of a central microprocessor unit. This microprocessor collects information from various sensors and accessories that are mounted on the firearm. The microprocessor also receives input from the user by way of control buttons and/or keypad. The microprocessor may interpret the sensory input to indicate certain conditions of the firearm. Such as "empty chamber", "action-open", "safety off", "bullet velocity", "shot fired", "range to target", etcetera. The microprocessor may then store this information to memory. This data may then be used to: determine firearm statistics, calculate bullet compensation factors, monitor maintenance intervals, and etcetera. Further, the microprocessor may time stamp these events as they happen. In this manner a chronological event log can be used to support police reports or maintenance logs. The microprocessor may also display this data to the user, or simply save the data to memory for future downloading to a computer or docking station.

Displaying the information from the simple to the complex could be described by the following examples:
  a. Having no display on the firearm itself But instead downloading the data to a laptop computer (or docking station) for display and data manipulation.
  b. Displaying a generic "go" or "no-go" status to the user by activating a green or red LED on the firearm. The "go" status (green LED) would indicate that there is a round in the chamber, the firearm is cocked, and the safety is off (i.e. the firearm is ready to fire). The "no-go" status (red LED) would indicate that the gun is not ready to fire (i.e. out of ammunition, action open, safety on, etc.).
  c. The next higher level of display sophistication might include the "go" & "no-go" status described above in combination with a numeric readout that indicates the number of rounds left in the gun.
  d. The next higher level of display sophistication might include (for example) an LCD display that unfolds from the pistol grip or butt stock. This display might indicate all sensory status points, as well as firearm statistics.
  e. As a last extreme, the most sophisticated display might be that of superimposing the data onto the optics of a rifle scope. The rectal of the rifle scope could then be further adjusted by the microprocessor to compensate for bullet drop, windage, and etcetera. The microprocessor would determine these bullet compensation factors by making calculations from collected data (i.e. rangefinder, inclinometer, wind-meter, chronograph, and etcetera), or by a set of pre-programmed bullet-drop-compensation tables.

Additionally this firearm system can be used with a central command point. For example; the real-time data can be displayed in a riflescope as detailed above. This could be an electronic riflescope with a CCD camera for the objective lens, and a small high-resolution color LCD display for the eyepiece. The LCD display information could then be wirelessly transmitted to a central command point where the video stream can be recorded and viewed by other decision makers. These decision makers can then remotely control features of the firearm. Such as releasing the safety and giving the field person permission to shoot, or even remotely "pulling-the-trigger" as the field person keeps the firearm pointed at the target. Alternatively, the decision makers can send a text message or other signal to the user that is displayed in the riflescope.

Lastly, this firearm system can have a security access feature in which a password must be entered before the firearm is activated. Alternative to a password, a magnetic key, or radio frequency identification reader (such as that used in with security access cards) could be used to gain access to the firearm.

It is understood that the present invention is not intended to be misused by governments in a way that violates, limits, or infringes upon the individual right to privacy, self-defense, or the right to bear arms.

DRAWINGS

Figures

Figure 8:
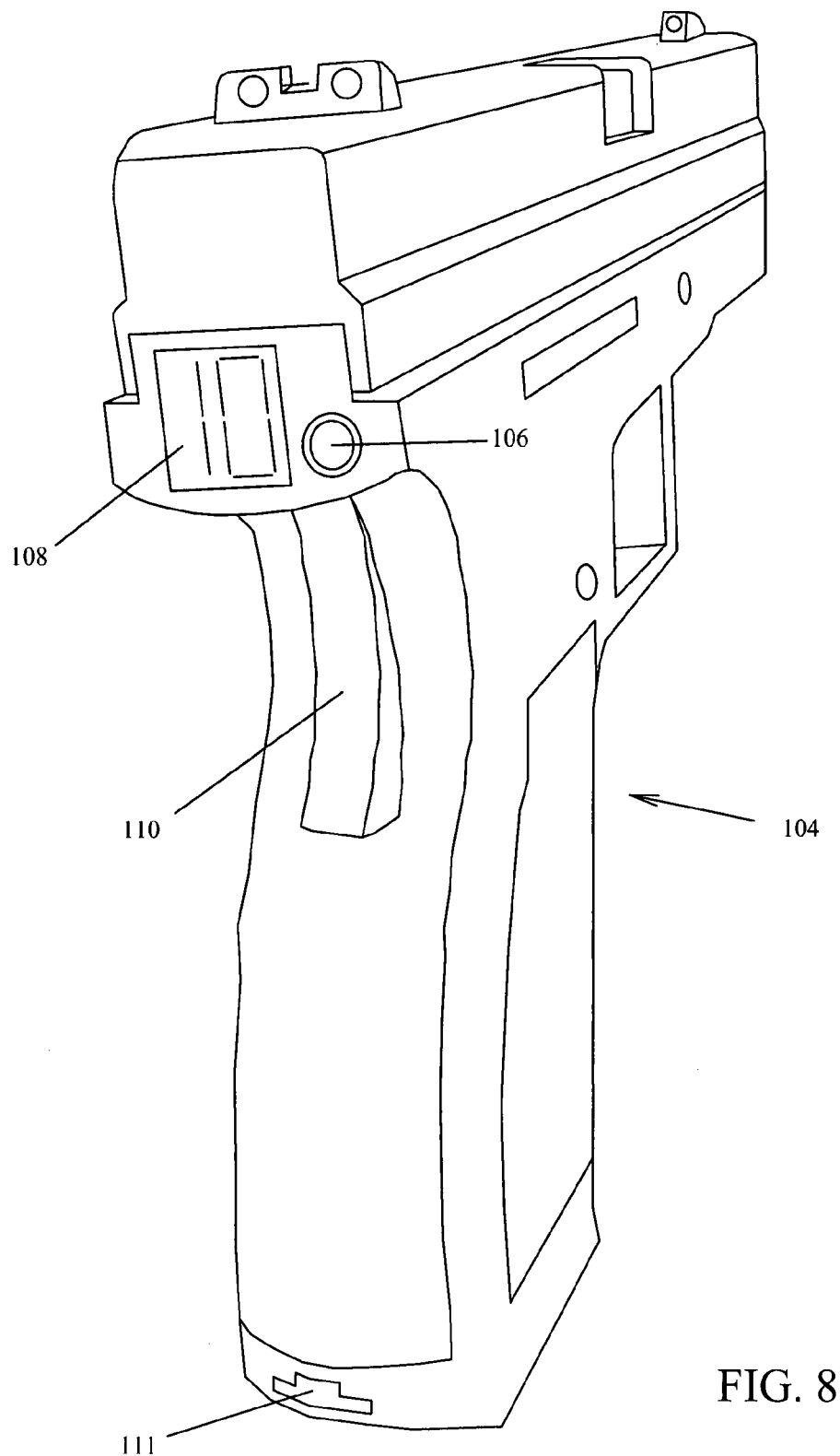

FIG. 8. is an illustration depicting the rear view of firearm with a simple firearm system display.

Figure 9:
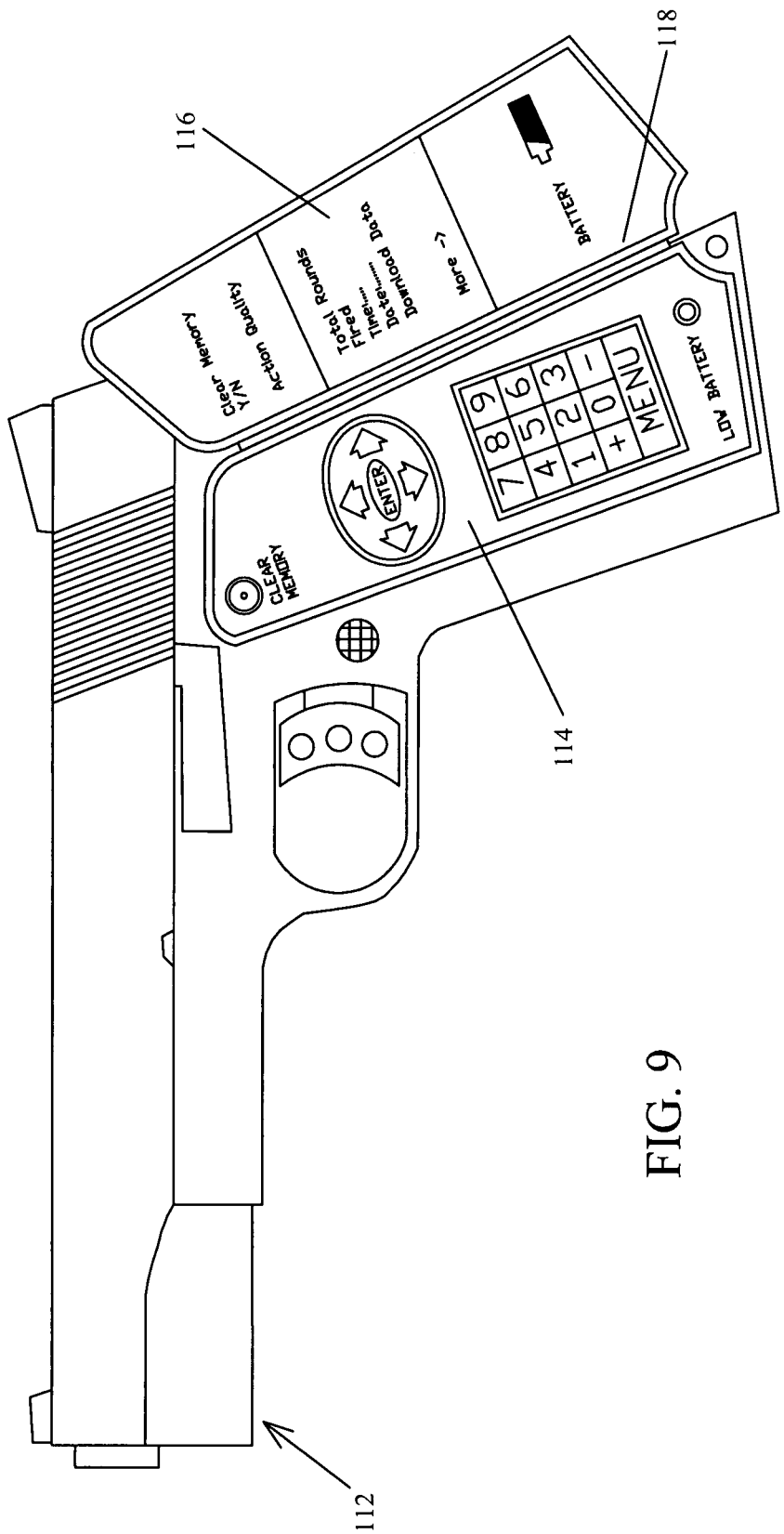

FIG. 9 is an illustration of a pistol incorporating the firearm system with a fold out display and user keypad.

Figure 10:
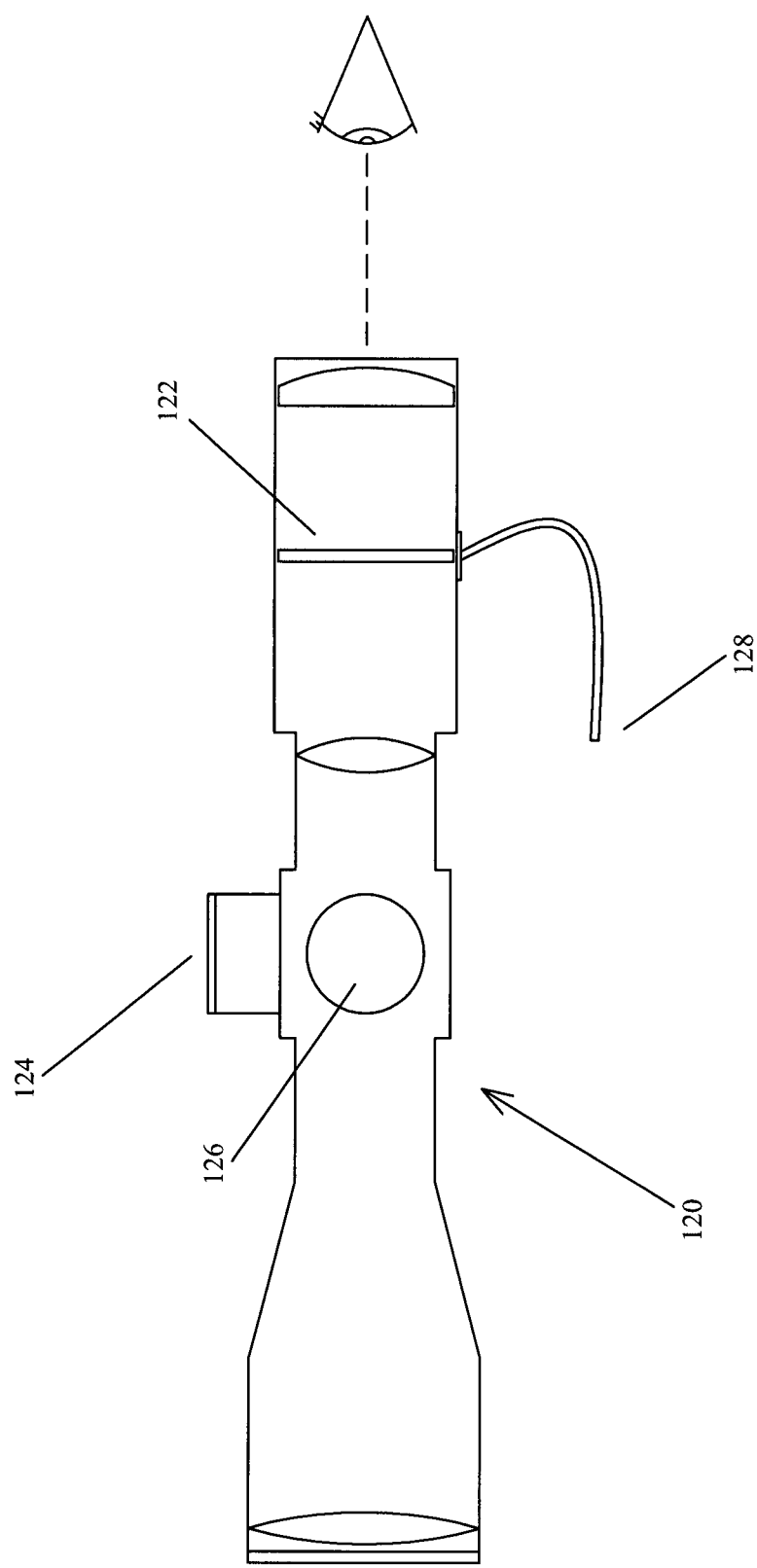

FIG. 10 is an illustration showing the incorporation of an optical riflescope with a means for displaying the firearm system data.

Figure 11:
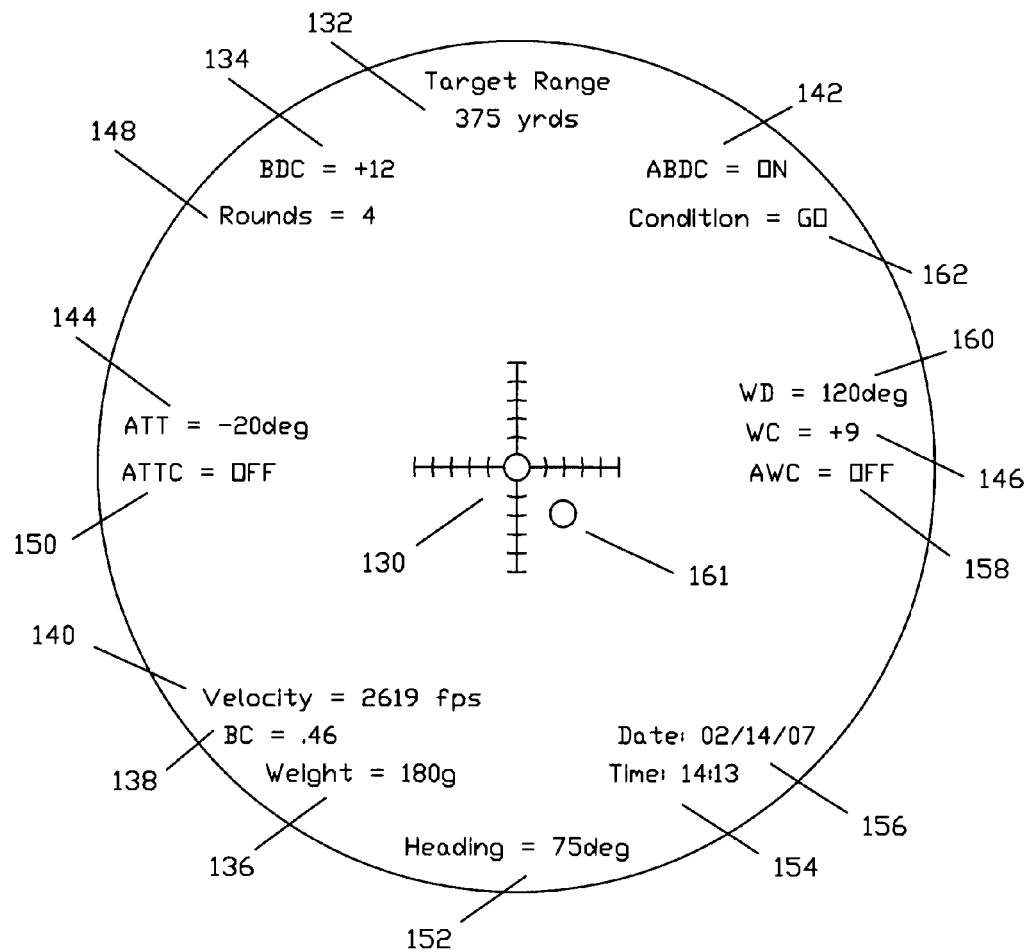

FIG. 11 is an illustration showing the actual display of the above optical rifle scope.

Figure 12:
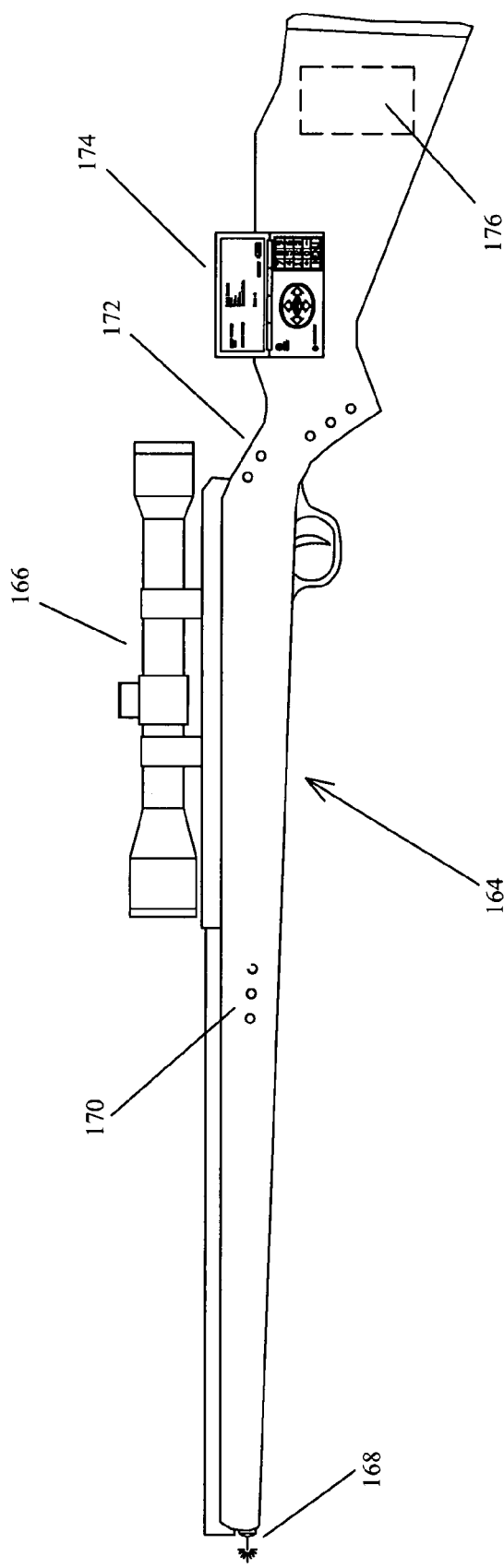

FIG. 12 is an illustration of a rifle that is integrated with a firearm system, and includes an optical riflescope with built-in display.

Figure 13:
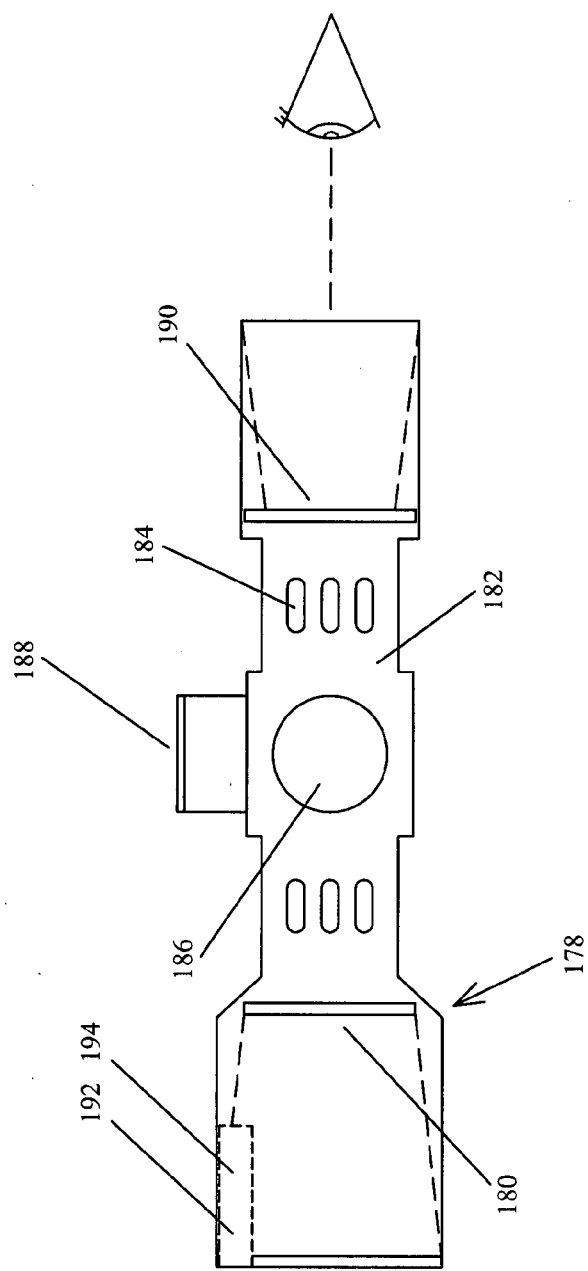

FIG. 13 is an illustration of an electronic scope with integrated firearm system.

Figure 14:
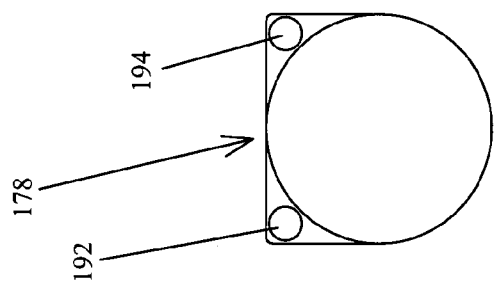

FIG. 14 is an illustration showing the frontal view of the above electronic scope.

Figure 15:
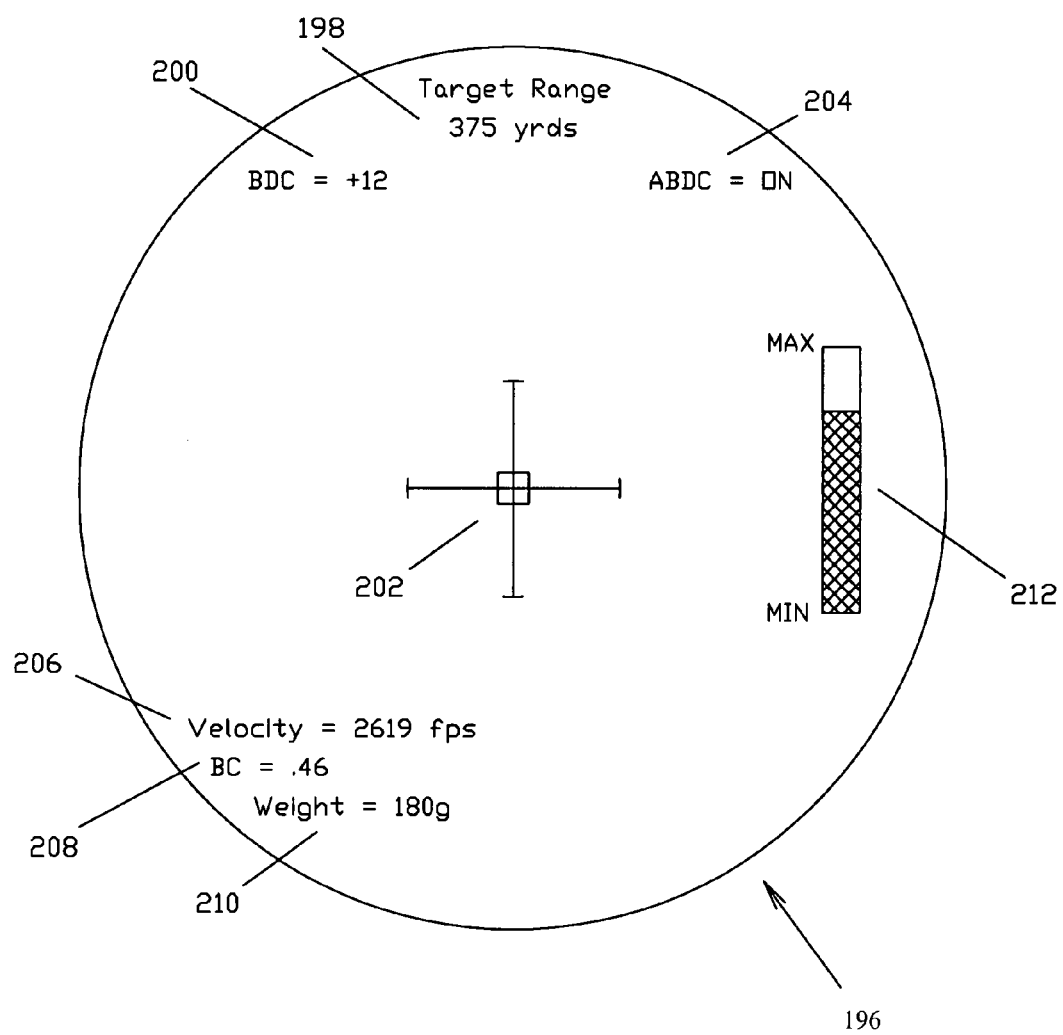

FIG. 15. is an illustration showing the actual display of the above electronic scope.

DETAILED DESCRIPTION

FIGS. 1 through 15

FIG. 1 through FIG. 15 depict specific preferred embodiments of the present invention for purposes of illustration only. One skilled in the art will recognize from the following discussion that alternative embodiments of the structures and methods illustrated herein may be employed without departing from the invention.

Figure 1:
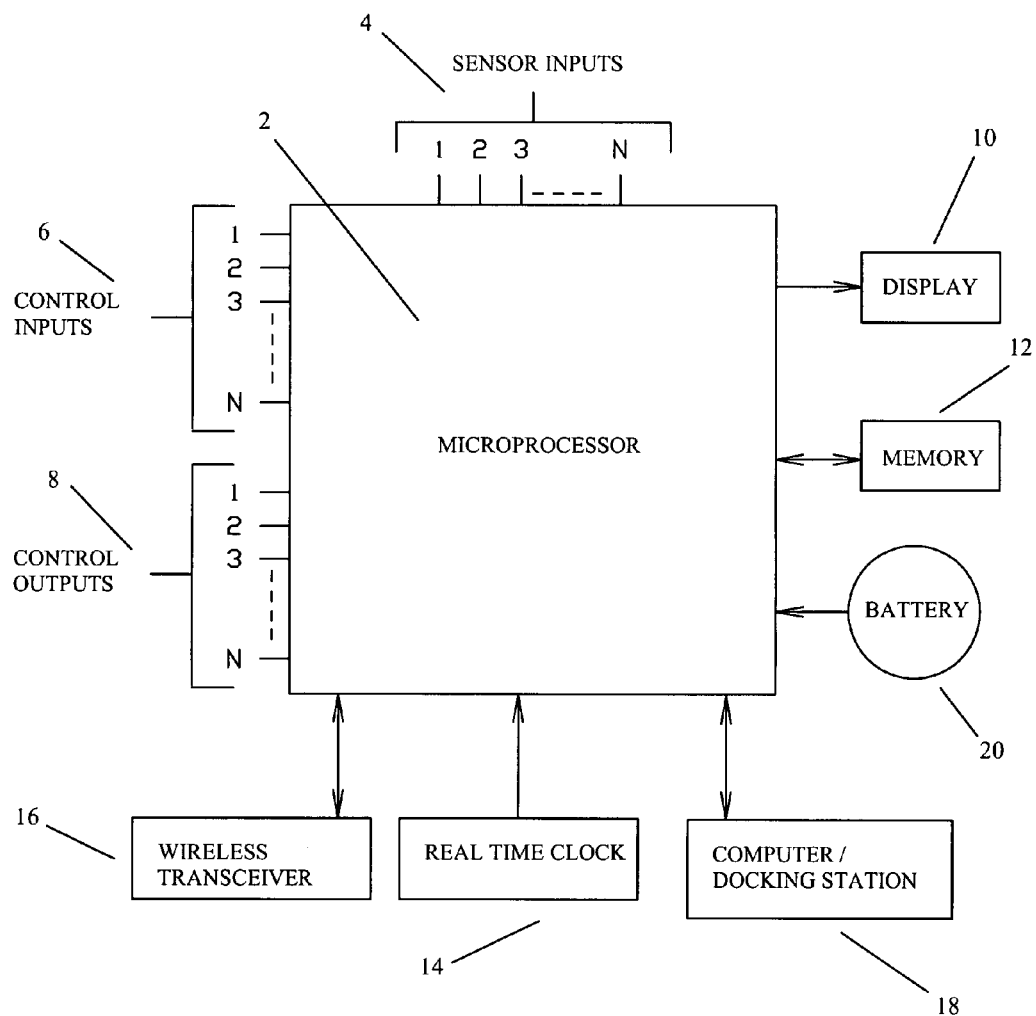
FIG. 1 is block diagram depicting the microprocessor architecture of the firearm system.

Now referring to FIG. 1; This diagram depicts a typical architecture of the firearm system. The focal point of the architecture is the microprocessor 2. Here the microprocessor communicates with and/or controls the firearm system. The microprocessor receives sensory data through sensor inputs 4. The sensors associated with these inputs are located on the firearm itself, and will be discussed in later figures.

The microprocessor will also receive user data and commands through control inputs 6. These inputs may come from buttons, knobs, or keypads that are also located on the firearm itself. The microprocessor may also be equipped with a security access feature where the user must satisfy a security measure (password, key, etc.) before gaining access to the firearm system. The microprocessor can also perform control operations (such as activating a solenoid). This can be accomplished through control outputs 8. As the microprocessor performs its' functions, it will output the associated data to a display 10. Here the display could be a light emitting diode (LED), or a liquid crystal display (LCD). A function of the firearm system display may also include adjusting the LCD reticle (cross hairs) of a rifle scope. The microprocessor will also have access to non-volatile memory 12. This is where the microprocessor program can reside, and can also be a repository for user entered data such as ballistic constants and trajectory tables. Additionally, memory 12 can be used to record events as they take place. These events will coincide with sensor input, control input, and control output. A real-time-clock 14 can also be used to time and date stamp these events as they are recorded into memory 12. This time stamp will be very important when Police Departments us the information to replay an Officer's shooting sequence. Real-time-clock 14 is not to be confused with the microprocessor timing clock (not shown). The microprocessor may also communicate wirelessly through a wireless transceiver 16. Here the microprocessor can communicate with remote sensors, command-and-control centers, and etcetera. The microprocessor may also be able to display and/or download its' data to a computer and/or docking station 18. Here the uniquely serialized firearm system can be programmed, diagnosed, and/or have all of it's' memory downloaded for display and data manipulation. This would be especially important for firearms that do not have a built-in display. It is understood that the docking station 18 can have the ability to accept multiple firearms. This would be particularly applicable to police stations where a large number of firearms must be managed. And of course the firearm system must have a battery 20 for power.

It is understood that not all firearm system embodiments will be programmed in the same way. Microprocessor programming will differ based on the actual function(s) to be performed, and the different types of inputs and outputs (sensors and displays), and other options to be used. Each firearm system should have a unique electronic serial number so as to differentiate each firearm system and associated data from another. Note that microprocessor programming is well understood in the art of imbedded system design.

The microprocessor circuit board itself can be made quite thin and small by using existing surface-mount technology, and integrated circuit ball-grid-array (BGA) technology. Further, using 3-volt circuitry will also help to reduce the battery size. For example, a single coin-battery is all that would be needed to run the microprocessor board. A larger battery (or additional batteries) may be needed depending on the type of sensors, actuators, and displays being used.

Rifles have ample room in the stock for locating the main circuit board, display, and battery for the firearm system. Pistols however will have much less room and will find the best locations underneath the pistol grips. Locating the circuit board in the pistol slide is also an option. Or the circuit board can be housed forward the trigger guard in an enlarged cavity of the pistol frame. This is the area of the pistol that is usually reserved for pistol accessories such as laser pointers, lights, and etcetera. In any case, military specification electronics that are encased in epoxy is a preferred embodiment. This encased circuit board would then be attached to the firearm in a shock resistant manner, such as housing the circuit board in a foam adhesive.

Figure 2:
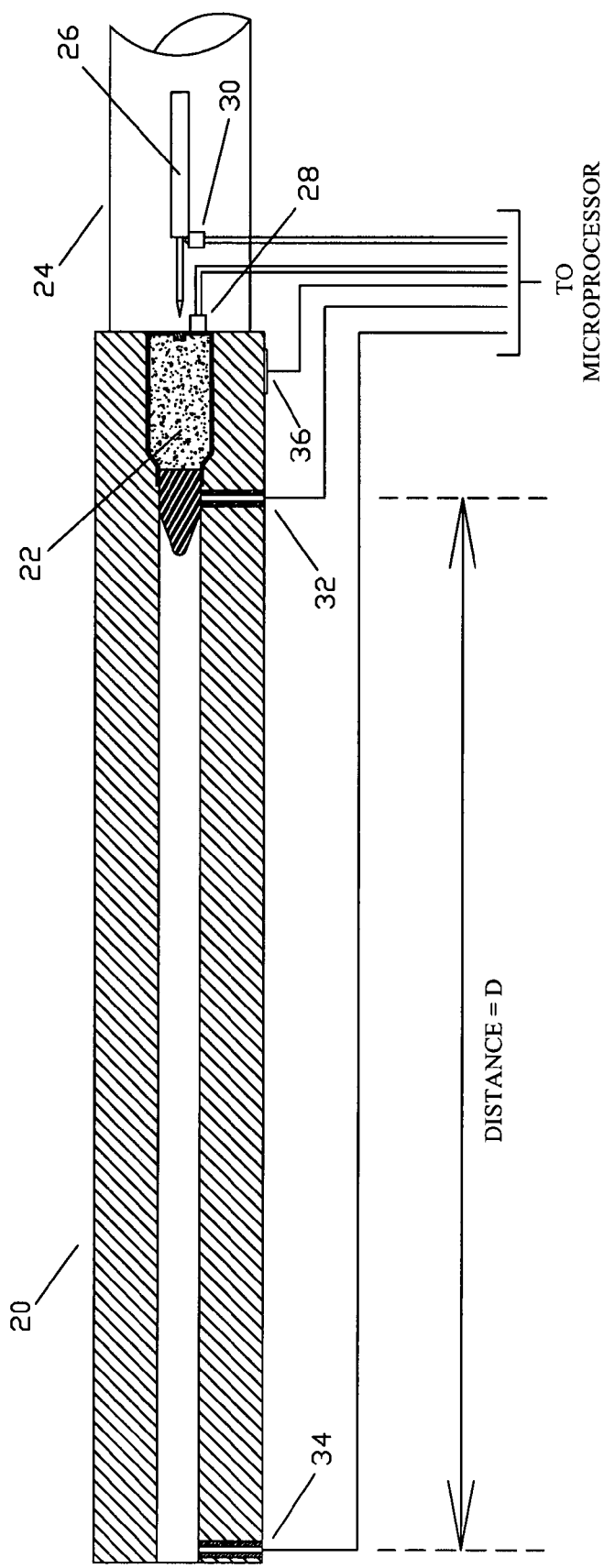
FIG. 2 is an illustration depicting typical chronograph and loaded chamber sensors.

Now referring to FIG. 2; this figure illustrates examples of some typical sensors that can be used with the firearm system. Here we have a barrel 20, ammunition cartridge 22, bolt 24, and firing pin 26. Note that the bolt could be of any action type such as a manual bolt-action, semi-automatic, or fully-automatic. Sensor 28 is a loaded chamber indicator and hence can determine the presence of a case in the chamber. With a manually operated action, the firearm system can only tell if a case is in the chamber (not necessarily an unspent cartridge). In other words, the cartridge may have been fired but the user has not worked the action to expel the empty case. However, an automatic action will automatically expel the empty case upon firing the weapon. Therefore, for automatic weapons the firearm system can assume that when sensor 28 is activated that there is a live round in the chamber. Notice the attention to avoid erroneous sensor detection between manually operated firearms and automatically operated firearms.

Sensor 30 is a firing pin sensor and can tell weather or not the firearm is cocked. Here too the sensor can be activated by the conductivity of the firing pin, or by being activated like a mechanical switch. In this manner the firearm system knows when the firing pin has been retracted, and hence when the firearm is cocked. Additionally the firearm system can now determine when the firing pin has been released, and hence if the trigger was pulled. In combination with the loaded chamber sensor 28, the firearm system may now be able to determine if the gun was fired. Naturally, the firearm system can record this information to memory. Keeping track of how many times the gun has been fired can also help determine the resale value of the firearm. The above is the first of several techniques described herin that the current invention can use to determine if the firearm was discharged.

Sensor 32 is a bullet sensor, and has certain advantages over sensor 28. Namely, sensor 32 can fully determine if a live round is in the chamber. This is due to the fact that sensor 32 is only activated by the presence of the cartridge bullet. If a bullet is not present, then the gun is not loaded. Here too the firearm system can use sensor 32 in combination with the firing pin sensor 30 to determine if the gun was fired. Sensor 32 would be particularly useful for determining if a manually operated firearm were discharged. Again, notice the attention to avoid erroneous sensor detection.

Sensor 34 is also a bullet sensor and can be used in combination with sensor 32 to make a bullet chronograph. Sensors 32 and 34 are both activated by the presence of a bullet, and are deactivated when the bullet leaves. Therefore, the firearm system can start a timer when the bullet leaves sensor 32, and stop the timer when the bullet leaves sensor 34. The firearm system now knows that the bullet started with zero velocity and was accelerated over a distance "D" in a known time. The acceleration of the bullet can now be calculated by using the mathematical laws of motion. It is also understood that the bullet is no longer being accelerated once it leaves the barrel. Therefore the velocity of the bullet after it exits the barrel (muzzle velocity) can also be calculated by using the mathematical laws of motion. Now the user has the same chronograph readings as those obtained from a traditional bullet chronograph. Furthermore, the firearm system chronograph can be calibrated against simultaneous readings from a known traditional bullet chronograph. This will provide better accuracy. The firearm system can now display the chronograph readings to the user, and/or record them into memory. Additionally the firearm system can use these measurements to determine bullet drop compensations as will be discussed later.

Notice that the chronograph could be subject to false-trips when the firearm is being cleaned and so forth. Therefore the firearm system would be programmed to only acknowledge small timer values that would be indicative of a high-speed bullet passing through the barrel. Naturally, any reasonable chronograph reading is also an indication to the firearm system that the gun has been fired. Notice again the attention given to avoid erroneous sensor detection.

It is also noteworthy to mention that the accuracy of the chronograph can be increased by inserting additional bullet sensors into the barrel. For example, an additional bullet sensor could be placed between sensors 32 and 34. In this manner the total bullet acceleration through the barrel can be broken down into the summation of two separate calculations. This will minimize the errors that can be introduced by non-linear accelerations. Naturally, the more sensors that are placed into the chronograph, the more accurate the final calculations become.

Variations of the firearm system bullet chronograph can be easily realized. For example; sensor 30 can be used in combination with sensor 34 to obtain chronograph readings. In this case the microprocessor would start a timer upon detection of firing-pin operation. Then the timer would be stopped upon detection of the bullet at sensor 34. The microprocessor would then perform chronograph calculations as detailed above. Note that this chronograph method may not be as accurate as the earlier method that uses sensors 32 & 34. However, the reliability and repeatability of modern firearm primers and powders makes this second method possible. This is due to the fact that the time it takes to fire the bullet out of the cartridge can be considered a constant. In other words, the time it takes for the firing-pin to ignite the cartridge and expel the bullet from the casing is a very repeatable amount of time. This time can be taken into account in the mathematical equations that are programmed into the microprocessor. Again, this chronograph method would benefit from being calibrated against simultaneous readings from a traditional bullet chronograph.

It is understood that all sensors and hardware associated with a firearm must be designed to withstand harsh physical and chemical environments. For example; sensors 32 & 34 can be of different configurations, but in FIG. 2 they are electrically insulted metal contacts that slightly protrude into the barrel. When the jacketed bullet passes over these sensors, the sensors are electrically shorted to the barrel (notice the frame ground and sensor return 36). This then indicates to the microprocessor that a bullet is present over the sensor at that instant in time. These contacts could be spring-loaded so as to be deflected when the bullet passes by. These sensors could also be of different configurations. For example, optical sensors could be used, or a dual electrode sensor in which the electrodes are shorted together by the passing jacketed bullet. This would eliminate the frame ground and would allow a "floating" electrical sensor system. In any case, these sensors must be able to withstand the corrosive gun powders and cleaning agents associated with firearm use.

It should be noted that the Firearm System may require readings from sensors that are located on moving parts of the firearm. Traditional wiring may not be adequate in these circumstances. Therefore, sliding and rotating electrical contacts can be used to address these issues. Rotating electrical contacts may be particularly important when applying sensors to revolver cylinders. Sliding and rotating contacts are well understood in the art of factory automation. Also notice that the failure of any firearm system component in FIG. 2 will not result is disabling the firearm.

Figure 3:
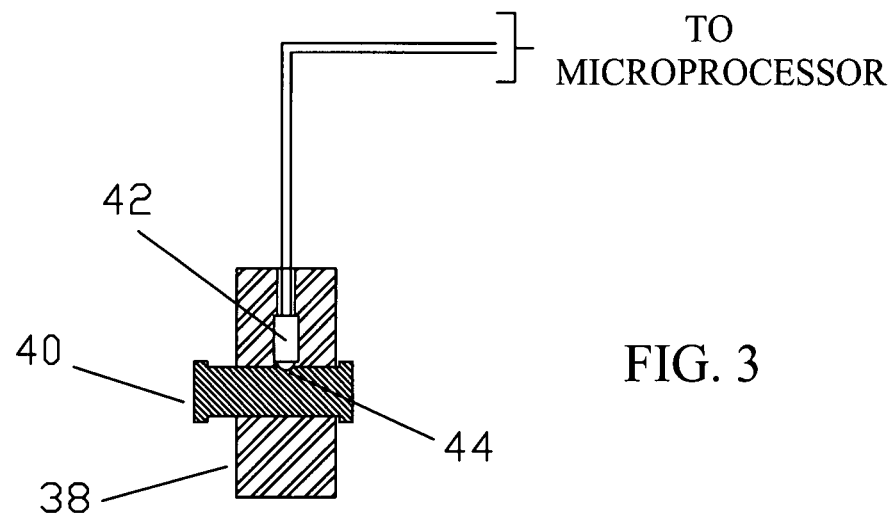
FIG. 3 is an illustration of a sensor that can monitor the position of the firearm safety.

Now referring to FIG. 3; this illustration depicts how the firearm system can detect the status of mechanical settings on the firearm. In this particular example the status of the mechanical safety is illustrated. Here we have a cross section of the firearm frame 38, a cross section of a typical safety button 40, and a contact sensor 42. Notice the recess 44 in the safety button. As this recess passes over the spring-loaded contact sensor, the sensor is allowed to protrude into the recess. In this manner the sensor can be activated, and hence the microprocessor can determine if the safety is engaged. Although not shown, the status of other firearm mechanics can be determined in the same way such as the position of the bolt, slide, magazine, cylinder, and etcetera.

The firearm system can use sensors such as this to record user manipulations of the weapon into memory. Additionally the firearm system can use such sensors to determine the status of the firearm. For example, the firearm system can determine if the gun is ready to shoot by determining if the safety is engaged, if the bolt is closed, if a magazine is installed, and etcetera. Again, notice that the failure of any firearm system component in FIG. 3 will not result is disabling the firearm.

Figure 4:
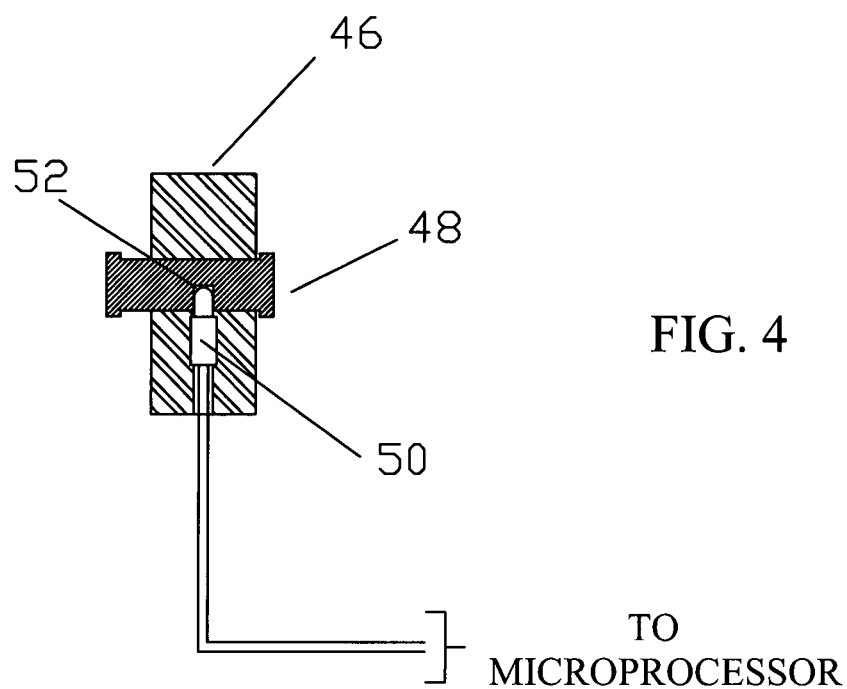
FIG. 4 is an illustration of a locking mechanism that can physically lock the position of the firearm safety.

Now referring to FIG. 4; this illustration depicts how the firearm system can control, lock, or release mechanical settings on the firearm. In this particular example the locking of the mechanical safety is illustrated. Here we have the cross section of a firearm frame 46, the cross section of a safety button 48, and a magnetically latched and spring loaded solenoid 50. Notice the recess 52 in the safety button. As this recess passes over the spring-loaded solenoid, the solenoid (when activated) is allowed to protrude into the recess, and hence lock the mechanical safety. The user will now be unable to change the position of the mechanical safety.

The fact that the solenoid is magnetically latched serves to save battery energy. In this manner the state of either of the two solenoid positions is magnetically held in place. The firearm system need only energize the solenoid coil to change the state of the solenoid. In this manner the coil need not be continuously energized and hence, precious battery reserves are spared. Alternative to magnetically latched solenoids, a spring loaded cam and/or lever arrangement can be used (not shown). In this manner one or more solenoids are used to change the state of the firearm mechanics, the state of which is held in place by the spring loaded cam/lever arrangement. Here too precious battery reserves are spared. The use of solenoids, cams, levers, and springs are well understood in the art of factory automation. For purposes of these discussions, we will consider any device that can provide a motive force (such as a solenoid, relay, actuator, motor, etc.) as an energetic component.

Variations of this implementation are also possible. For example, the safety button could have two recesses; one to correlate to when the mechanical safety is engaged, and one to correlate to when the mechanical safety is disengaged. In this manner the firearm system can lock the safety mechanism into its' current position. The user will now be unable to change the state of the mechanical safety.

Another variation might include matched solenoids and recesses that are located on opposite sides of the safety button. Each solenoid and recess combination would correlate to either the "engaged" state, or the "disengaged" state of the safety button. Here too the safety button can be mechanically locked into its' current position, but can also be ready to lock into the opposite state as the user slides the safety button to the opposite position.

Another variation of having the firearm system lock mechanical settings on the firearm would be to lock the firing pin (not shown). Here the firearm system can energize a solenoid to lock the firing pin into its' current position. This will effectively prevent the user from shooting the firearm as the gun cannot be cocked, nor can the firing pin be released by pulling the trigger.

The firearm system can also use solenoids and actuators such as these to lock other features of the firearm such as the bolt, magazine, slide, storage compartments, and etcetera. This will be particularly important when using the firearm system to effectively disable the firearm. In this manner the firearm will essentially be unusable until the proper security access features have been satisfied (i.e. password, key, etcetera). Also, as will be discussed later, a remote command-and-control would be able to enable or disable the firearm and/or specific firearm features. As previously stated, It should be understood that the current invention is not intended to be misused in a manner that infringes on the Constitutional right to bear arms.

Alternatively, the solenoids and actuators can be used to exercise a mechanical feature of the firearm. In this case the firearm system could engage the safety, release the firing pin to discharge the weapon, and etcetera.

The above discussions of FIG. 4 are one of only two circumstances of which the firearm "may" become disabled upon failure of the firearm system. For example, if the firearm is currently configured in an unusable state (such as the firing-pin being locked in position), and the system battery dies; then of course the firearm would be unusable until the battery is recharged and the firing-pin un-locked. Otherwise the firearm remains fully functional, even if the electronic firearm-system should fail.

Figure 5:
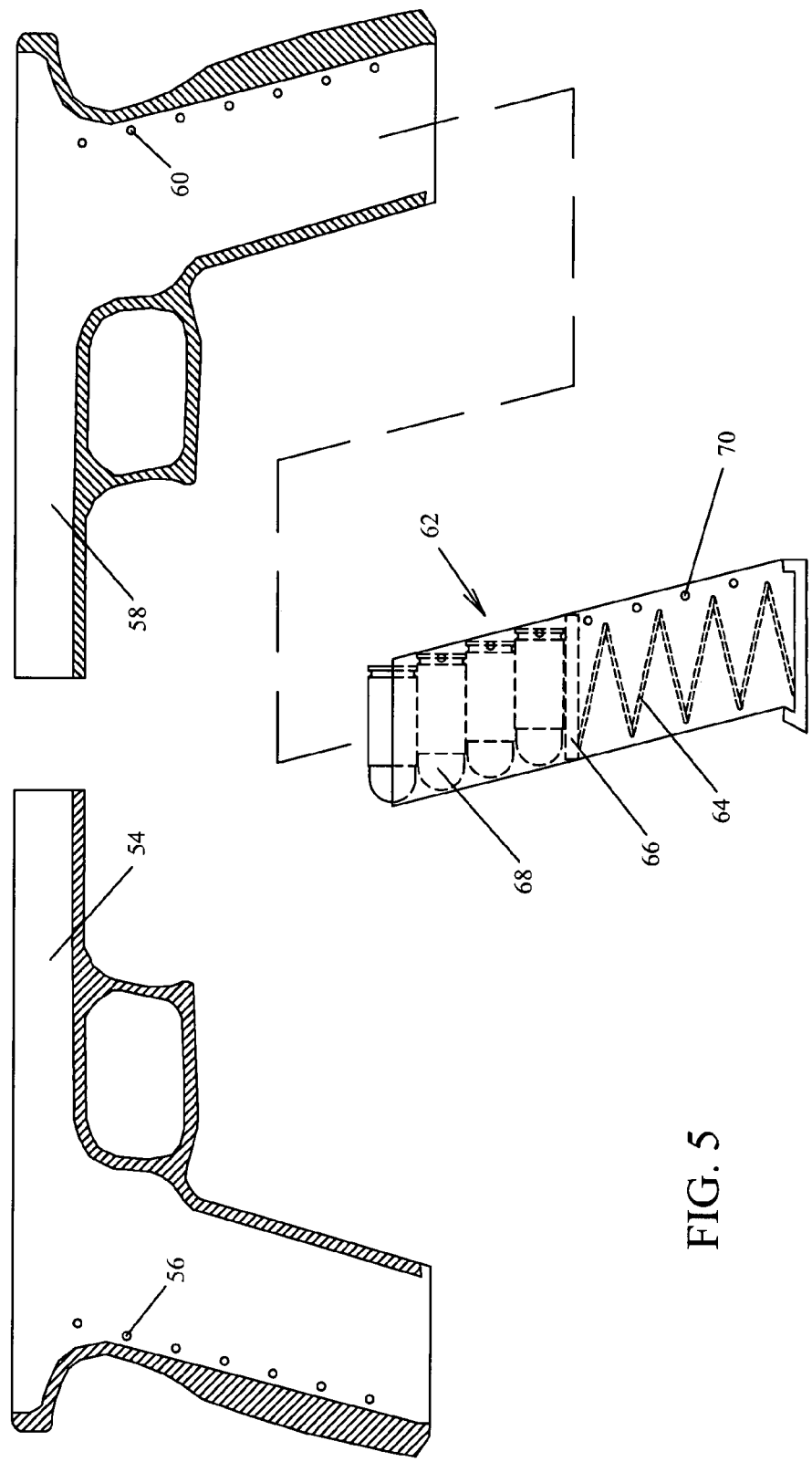
FIG. 5 is a first illustration of a magazine sensor array having multiple light emitting diodes (LEDs).

Now referring to FIG. 5; this illustration depicts how the firearm system can determine the amount of ammunition in a magazine. This particular example details the use of a pistol magazine. However, similar approaches can be used for rifles, or any other firearm using a magazine. Here we have the left side cross section of a pistol frame 54, with light detectors 56, a right side cross section of the same pistol frame 58, with light emitting diodes (LEDs) 60, a magazine 62, with spring 64, follower 66, cartridges 68, and light windows 70. Each light window 70 corresponds to a cartridge position in the magazine. This arrangement is such that the light from an LED can pass through a magazine light window and energize the corresponding light detector. As such, each LED, magazine window, and light detector are a matched set. The LED light is only able to pass through a magazine window as long as a bullet does not block the path. As the pistol is shot, more and more light windows are exposed. Hence, the firearm system is able to determine the amount of ammunition remaining in the magazine by simply determining which detectors can see light from the LEDs. When used in combination with the loaded chamber indicator 28, or bullet sensor 32 (see FIG. 2), the firearm system can determine exactly how many rounds are in the weapon. This is important as current inventions can only determine the amount of cartridges in the magazine . . . and this may not be the total cartridge count. Again, notice the attention given to avoid erroneous sensor readings.

It should be noted that optical detection systems can be subject to false trips. This can be caused by ambient LED light that is either generated by adjacent LEDs, or otherwise reflected within the firearm. These problems can be mitigated by using light dependant resistors (detectors). These are analog devices that can provide a determined threshold voltage to an analog to digital converter of the firearm system. In this manner the firearm system knows that those detectors above the threshold voltage are detecting direct light. Those with a lesser voltage would only be detecting ambient light. In this manner the firearm system can energize the LEDs one at a time to determine which light windows have been exposed. Alternatively, the firearm system can modulate the LED light. In this manner, each detector would be expecting a unique modulation scheme. When the firearm system sees that a detector has received the correct modulation scheme, then it knows that the corresponding light window has been exposed. The use of modulation to prevent false sensor trips is well understood in the optical sensor manufacturing industry.

A variation of this (not shown) could include an array of mechanical switches (spring loaded pins) that extend into each light window. As a light window is exposed, the corresponding spring loaded switch would be able to extend into the light window. With this switch now activated, the firearm system would be able to determine that one less round of ammunition is available.

Figure 6:
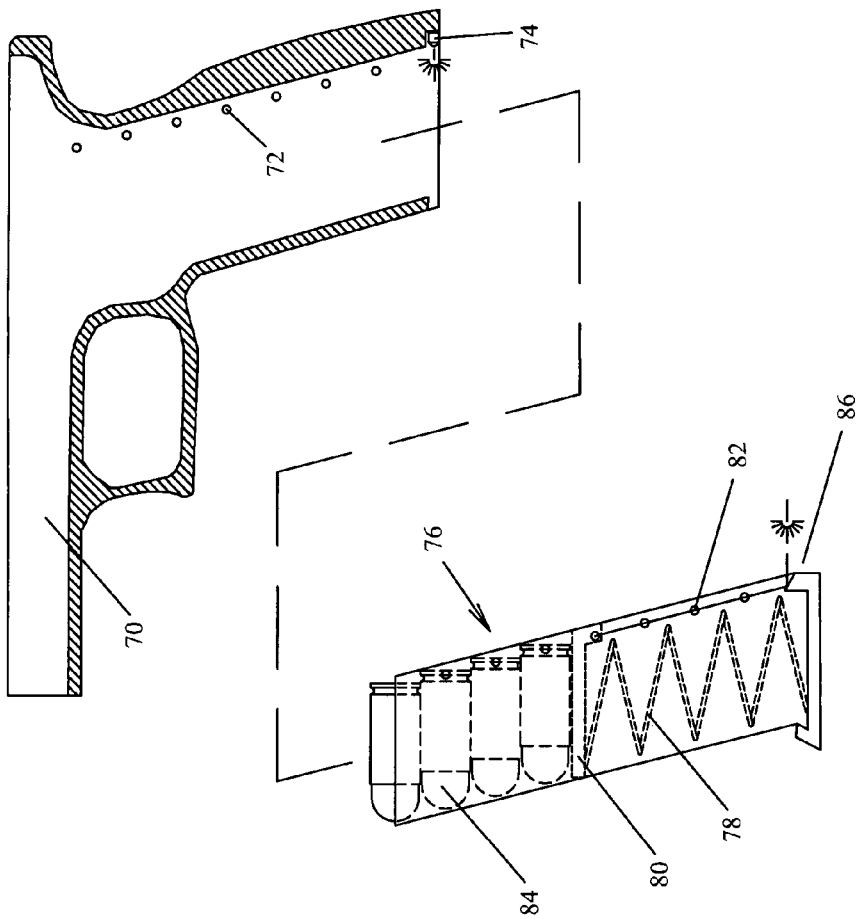
FIG. 6 is a second illustration of a magazine sensor utilizing only a single light emitting diode (LED).
Figure 6:
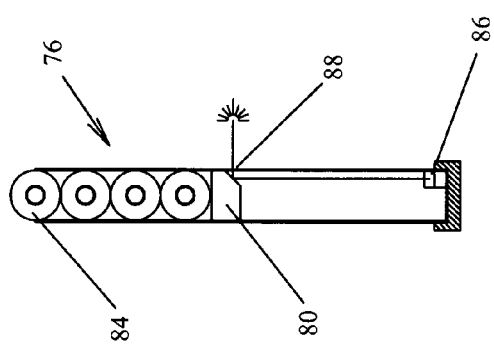

Now referring to FIG. 6; this figure depicts a second illustration on how the firearm system can determine the amount of ammunition in a magazine. This particular example also details the use of a pistol magazine. Here we have the left side cross section of a pistol frame 70, with light detectors 72, and light emitting diode (LED) 74. We also have a magazine 76, with spring 78, follower 80, light windows 82, and ammunition 84. Each light window 82 corresponds to a cartridge location as referenced by the position of the magazine follower. Notice the bottom reflector 86 at the magazine base, and follower reflector 88 located underneath the follower. This arrangement is such that the light from the LED 74 enters the bottom of the magazine and is reflected off the bottom reflector 86, and up towards the follower reflector 88. In doing so the LED light is reflected to a light detector 72 that corresponds to the position of the magazine follower. As the ammunition is used, the follower moves up and illuminates the next light detector. Hence, the firearm system is able to determine how many rounds are in the magazine.

A variation on this (not shown) would be to have the magazine follower make contact with electrical connections inside the magazine. In this manner, electrical traces would be placed inside the magazine. As the follower moves inside the magazine, it completes the circuit between different electrical traces. Thus indicating the location of the follower, and hence the amount of ammunition remaining in the magazine.

Notice that in the above discussions of FIGS. 5 & 6 that a failure of the electronic firearm system will not leave the firearm in a disabled state.

Figure 7:
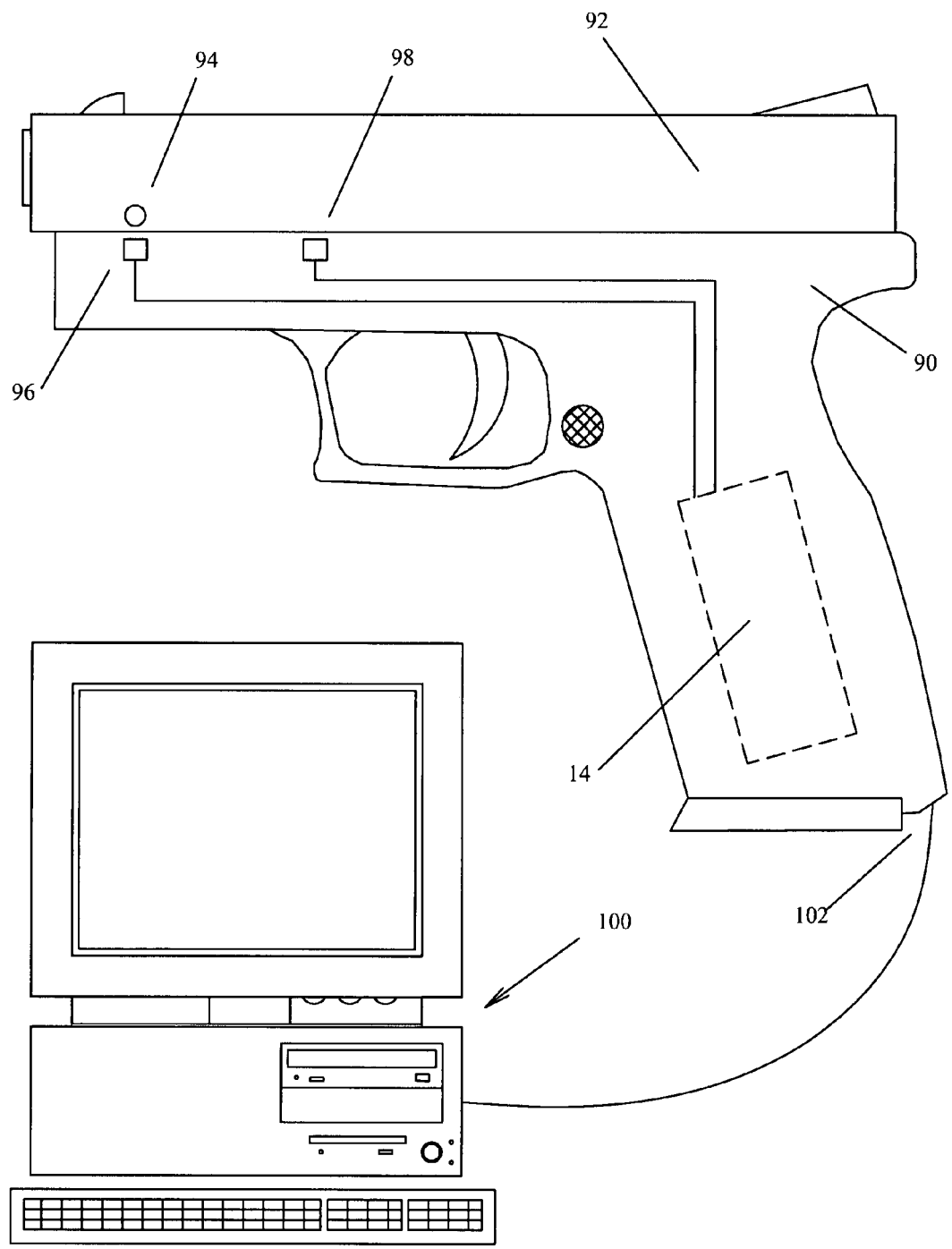
FIG. 7 is an illustration depicting the side view of a pistol with sensors for measuring the firearm action.

Now referring to FIG. 7; this illustration depicts how the firearm system can measure the action of an automatic weapon. This particular example details an application to the slide action of a pistol. However, similar approaches can be used for the bolt on semiautomatic rifles, and etcetera. Here we have a frame 90, slide 92, a switch trip point 94, a first contact switch 96, and a second contact switch 98. The switches and trip point are located such that when the slide is closed, the first switch 96 is activated. And when the slide is open, the second switch 98 is activated. In this manner the firearm system can not only determine the position of the slide, but can also determine how fast the slide operates. To determine how fast the slide opens, the firearm system simply has to measure the time it takes between the deactivation of the first switch, to the activation of the second switch. Likewise, the firearm system measures the time it takes from the deactivation of the second switch, to the activation of the first switch to determine how fast the slide closes. Note that other sensor types could also be used such as Hall Effect sensors, optical switches, proximity sensors, and etcetera.

Note that the user can operate the slide by hand, or the slide can be operated when a round is fired. When the slide is operated by hand, the slide is pushed rearward much more slowly than when a round is fired. The firearm system will use this distinction to determine if the gun was fired, or if the action was just operated by hand. Again, notice the attention given to avoid erroneous sensor reads. Additionally, the firearm system can keep track of the time it takes for the action to cycle when the gun is fired. When the action begins to slow down, the firearm system can notify the user that the gun needs servicing. Likewise the firearm system can count the number of times that gun has been fired, and notify the user of maintenance intervals, statistics, and etcetera. Keeping track of how many times the gun has been fired can also help determine the resale value of the firearm.

The firearm system can also use these sensors to determine if the gun is out of ammunition, or even if there has been a malfunction, or failure to feed the ammunition. For example; on most semiautomatic weapons, the action will remain open after ejecting the last spent cartridge. Therefore, when the action is opened within a short timeframe as when a round is fired, and the action remains open, then the firearm system knows that the gun is out of ammunition. Similarly, if the action opens within a short timeframe as when a shot is fired, the slide opens completely and then begins to close but fails to close; then the firearm system knows that there has been a failure to feed the ammunition, or that there has otherwise been a malfunction. This failure can be recorded into memory, and can be an indication to the firearm system that maintenance is needed. It is important to note that these readings can be combined with information from other sensors to provide additional information and certainty in the outcome. For example; if the gun is discharged with the last round in the chamber, the action stays open as expected, but the chamber sensor indicates that there is still a case in the chamber; this indicates that the firearm extractor may be broken.

Naturally the user will know that there has been a malfunction or failure to feed the ammunition without needing the firearm system to tell them so. However, recording this information can be useful for warranty repair diagnostics and statistics. Statistics such as these can also be used by the factory quality control department to document how the gun passes manufacturing inspections. These statistics would be very important to a person buying a used firearm.

Lastly, the firearm system can be connected to a computer and/or docking station 100, by means of a data port 102. A docking station is generally used for frequent and routine data downloads. Here the user can have complete interaction with the firearm system. Data can be downloaded, the firearm system can be programmed, and the firearm system can be diagnosed and maintenanced as well. It should be understood that the firearm system need not have a local display on the gun itself. The display could reside entirely on a computer/docking-station, on the gun itself, or both.

Again, notice in the above discussions on FIG. 7 that the failure of any electronic firearm system component will not result in disabling the firearm.

Now referring to FIG. 8; this illustration depicts how the firearm system can provide visual feedback to the user. Here we have the rear view of a pistol 104. Notice the dual color light emitting diode 106, and two digit seven segment display 108. Here the dual-color LED is used to indicate the "ready status" of the gun. For example; "green" if the gun is ready to fire (i.e. the safety is off, gun is cocked, and there is a round in the chamber), and "red" if the gun is not ready to be fired (i.e. not loaded, safety engaged, etcetera). The red LED could also flash when maintenance is required. Next to the LED is the "seven-segment" alphanumeric display 108. This is used by the firearm system to display the number of rounds left in the gun. Notice the grip safety 110 as is common on many handguns. In this embodiment however, the grip safety also serves to turn the firearm system on and off. In this manner the battery is preserved as the firearm system is only activated when being held by the user. This embodiment also has a communications data port 111 for connection to a computer and or docking station. Although not shown, this embodiment could also have control buttons to interact with the user.

Now referring to FIG. 9; this is a second illustration depicting how the firearm system can provide interaction with the user. Here we have the side view of a pistol 112, with a keypad assembly 114, and display assembly, 116. Notice how the keypad and display are integrated into the pistol grip. The keypad and display are accessed by opening and unfolding the pistol grip. This is accomplished by the cell phone type hinge 118. Unfolding compact electronics of this type are common in the cellular telephone manufacturing industry. Here the user can have complete interaction with the firearm system. The system can be programmed, historical data can be viewed, and statistics can be displayed. However, when the grip is closed the pistol looks and feels like an ordinary handgun. Although not shown, buttons and display electronics could be located elsewhere on the firearm as well.

Now referring to FIG. 10; this illustration depicts how the firearm system can provide visual feedback to the user by means of a heads-up-display in a rifle scope. Here we have a typical optical riflescope 120. Notice however the insertion of the transmissive liquid crystal display (LCD) 122 that has been placed in the optical path. This LCD is used to superimpose firearm system information onto the scope optics. Note that LCDs are transparent in nature until particular segments are activated. This is the basic design principle behind LCD projection televisions. Therefore the LCD window 122 will pass the scope image, and segments of the LCD can be activated to superimpose display information onto the scope optics. The cross-hairs (reticle) of the riflescope could be of the traditional mechanical nature, or they could be electronically produced on the LCD window. For a traditional reticle, mechanical adjustments would be made by the elevation knob 124, and windage knob 126. For an electronic reticle, the windage and elevation knobs would be electronic dial switches that would provide user input to the firearm system. This input from the user would instruct the firearm system to adjust the reticle in a manner that would allow the scope to be "sighted-in", or "zeroed". A scope is typically zeroed to some multiple of one-hundred yards. All of the scope electronics can be connected to the firearm system through electrical connection 128.

A variation to this embodiment would be to use a zero power LCD window. Such as a zenithal bistable device LCD. This LCD technology maintains the LCD image even when electrical power is removed from the LCD device. The image can only be changed when the LCD is under power. When power is removed, the LCD remains fixed with its' last image. This approach would be particularly useful when the firearm system battery looses power. Although the reticle would be fixed at its' last setting, the firearm scope and reticle would still be usable. Notice the attention given to provide a usable firearm even if the battery should die.

Now referring to FIG. 11; this illustration depicts the heads-up-display that would be seen through the scope as defined earlier in FIG. 10. Here we have the scope image as seen by the user. Notice reticle 130. Again, this reticle can be of the traditional mechanical nature, or could be produced by the firearm system on the transmisive LCD window. A rangefinder (discussed below) is connected to the firearm system and is used to display the target range 132. The firearm system uses this range information to calculate and display the required bullet-drop-compensation (BDC) factor 134. This is calculated by a trajectory algorithm within the firearm system, or by interpolation from trajectory tables that the user has pre-programmed into the firearm system. If an algorithm is used, then the user must enter mathematical constants into the firearm system. These constants could also be displayed to the user such as bullet weight (weight) 136, the bullet ballistic coefficient (BC) 138, bullet velocity 140, and etcetera. The bullet velocity can be obtained by a built-in chronograph as described earlier, or from user programmed data. If tabular data is used, then the user must be shooting the same gun and type of cartridge that was used to generate the tabular data. Notice that if the automatic-bullet-drop-compensation (ABDC) 142 is on, then the firearm system will automatically adjust the position of the cross-hairs (reticle) 130 to compensate for the calculated trajectory. This would apply to a reticle that is generated on the LCD by the firearm system. Similarly, the angle to target (ATT) 144, and wind compensation (WC) 146 can also automatically be compensated for. Trajectory compensation is basically limited to the amount of sensory input and/or data that is accessible to the firearm system, and the sophistication of the trajectory algorithm(s) being used. It is understood that the firearm system would have to be programmed to know at what distance the scope has been zeroed to. Trajectory compensations would be based relative to this zeroed distance.

Any information that can be collected and/or generated by the firearm system can be displayed. Therefore in this illustration we also have the number of rounds 148 remaining in the weapon, the status of the angle to target compensation (ATTC) 150, compass heading 152, current time 154, date 156, status of automatic wind compensation (AWC) 158, wind direction (WD) 160, and the operational status of the gun (Condition) 162.

Another variation of this embodiment would be to use the above rifle scope in combination with a traditional mechanical reticle. The scope reticle is then mechanically zeroed as usual. However, the firearm system would be able to produce a supplemental aiming mark 161 such as a small dot, circle, or sub-reticle. The firearm system would place the aiming mark to indicate the location that the user should aim for trajectory compensation. Notice that the firearm system has adjusted the supplemental aiming mark 161 both vertically (for bullet drop compensation), and horizontally (for windage). The location of the aiming mark would of course have to be calibrated against the scopes' mechanical reticle zero. In this manner the firearm system would be able to determine where to place the aiming mark relative to the mechanical reticle. This particular embodiment would be particularly helpful for when the firearm system looses battery power or has otherwise failed. In this manner the mechanical reticle does not rely on the firearm system, and is still operable even when the battery dies, or the electronics otherwise fail. Notice again the attention given to provide a fully functional firearm even under conditions of electronics system failure.

Notice that it is not necessary for the firearm system to have a local display on the firearm. The firearm system could simply display its' information whenever it is connected to a computer and/or docking station. In this manner a consumer can buy a basic firearm system with no display, but could later buy a display (such as the above rifle scope) as an accessory.

Now referring to FIG. 12; this illustration depicts how the firearm system can be integrated into a rifle 164. Here we have a scope 166 as depicted earlier in FIGS. 10 & 11, a laser range finder 168, forward input buttons 170 on the foreword stock, rear input buttons 172 on the rear stock, a door 174 for access to the but stock keypad and LCD display, and the location of the firearm system circuit board and batteries 176. Here the laser range finder 168 can provide range-to-target information to the firearm system. The firearm system can then display this information to the user on the scope 166 and/or on the stock display. Additionally the firearm system can use the range-to-target information and built-in chronograph readings to dynamically adjust the LCD reticle on the rifle scope. This dynamic embodiment provides for ease and convenience of accurate marksmanship as never experienced before.

Again, the firearm system can calculate the bullet trajectory by means of the built-in chronograph readings and calculations, or by interpolation of ballistic tables. In this embodiment the user can aim the rifle on target while simultaneously using the buttons to determine target range, select bullet compensations, monitor statistics, and etcetera. A data port (not shown) can also be used to download data from memory, and can be used to program parameters into the firearm system. Also notice the extended stock that covers all the bullet sensors of the built-in chronograph.

A myriad of other sensors and actuators could be used but are not shown. For example, this particular implementation could have a loaded chamber indicator, firing pin actuator, firing pin sensor, a magazine sensor to determine the number of rounds remaining in the magazine, bolt and/or action sensors, and etcetera. The actual number and type of sensors and actuators is only limited by the firearm designers' creativity.

For a more simplified approach, the firearm system could be implemented in a rifle that only has traditional "iron-sites". In this manner the firearm system could have an elementary display such as that shown previously in FIG. 8. In this case the display could be located near the rear "iron-site", or other convenient location. Of course the most simplistic approach would be to have no display whatsoever on the firearm; but have all of the firearm system information available through a computer/docking-station.

Now referring to FIG. 13; this illustration depicts how the firearm system can provide visual feedback to the user by means of an electronic riflescope. Here we have an electronic riflescope 178 with a built in firearm system. Notice that the image is captured electronically by the charge-coupled-device (CCD) camera 180. The image is then processed by the firearm system that is located inside the main electronics housing 182. A series of user interface buttons 184 are located on the outside of the main electronics housing 182. Also located on the outside of the main electronics housing is the windage knob 186, and elevation knob 188. The firearm system displays the CCD camera image on LCD 190. This image includes the LCD reticle that is superimposed on the camera image. Knobs 186 & 188 are used to electronically zero the scope by adjusting the LCD reticle. Notice that the front of the scope contains a laser rangefinder. This consists of a laser rangefinder laser 192, and a laser rangefinder detector 194. The range-to-target information from the rangefinder can be used by the firearm system to adjust the scope reticle for trajectory compensation. Although not shown, this unit could also have a wireless transceiver for communicating with a central command and control point. This control point would be able to see the entire image as captured by the CCD camera, as well as the firearm system data. This would allow command and control personnel to supervise the firearm user, record the data, or even send commands and additional data to the firearm system. Notice that this approach could be implemented on a traditional optical scope such as that discussed earlier in FIG. 10. However, a remote command and control point would only be able to see the firearm data, as there would not be a CCD camera to capture the image from the scope.

Now referring to FIG. 14; this illustration depicts the frontal view of scope 178 that was described earlier in FIG. 13. Notice the location of the rangefinder laser 192, and rangefinder detector 194. Notice that this scope is a self-contained unit. All electronics and sensors are contained within the scope. This embodiment would be an excellent application for legacy firearms that do not have a built-in firearm system.

Now referring to FIG. 15; this illustration depicts a typical heads-up-display that would be seen through the scope as described above in FIGS. 13 & 14. Here we have the scope image 196 as seen by the user. This includes the range to target 198 as obtained by the built-in laser rangefinder. The firearm system uses this range data to calculate the amount of bullet-drop-compensation (BDC) 200, and can also automatically adjust the cross-hairs (reticle) 202 of the scope to compensate for the bullet trajectory. This is indicated by the status of the "automatic bullet drop compensation" (ABDC) 204. Other mathematical constants that the user must enter into the firearm system are shown on the bottom of the display. Here we have the bullet velocity 206, bullet ballistic coefficient (BC) 208, and bullet weight 210. Other parameters can be entered into the firearm system as required. Again, the firearm system can calculate the bullet trajectory by an algorithm, or by interpolation of tabular trajectory data. Since the image is in electronic form, the electronic scope (i.e. firearm system) can digitally magnify or "zoom" into the image as is common with modern electronic cameras. This feature is indicated by the zoom status-bar 212 on the display.

The embodiment that uses an LCD-only reticle (that is only visible when power is applied) is the second and last of only two circumstances of which the firearm "may" become unusable upon failure of the firearm system. For example, if the battery dies on a scope with an LCD-only reticle; then the reticle will no longer be visible. This problem can be avoided by using a zero power LCD as discussed above under FIG. 10. Or as is common in the industry; the firearm could be equipped with elevated scope mounts that allow the use of iron-sites as a backup. Otherwise the firearm remains fully functional, even if the electronic firearm-system should fail.

Although not shown, the firearm system could also be used to supplement firearms and rifle scopes that do not contain a firearm system. Here the firearm system could be implemented in a hand held device such as a spotting scope or binoculars that have a built in range finder. This embodiment would not be able to automatically adjust the cross-hairs (reticle) of a riflescope. However it would be able to provide bullet-drop-compensation numbers to the user. The user would use these numbers to adjust their aiming point as needed to compensate for the bullet trajectory. Again, the firearm system would calculate the bullet trajectory by an algorithm, or by interpolation of tabular trajectory data. This would be a convenient embodiment for users with legacy firearms and riflescopes.

CONCLUSION, RAMIFICATIONS, AND SCOPE

Accordingly, the reader will see that this device consists of a microprocessor circuit that is used to monitor and control a firearm. The microprocessor accomplishes this by monitoring various sensor & control inputs, and acting on these inputs to execute user defined functions. These functions may include providing a control output, a display output, or simply recording firearm events to memory. Naturally the device can use new sensor types and configurations as they are developed.

Also notice the attention given to provide a reliable firearm that is still fully functional under almost all electronic-system failures. Extensive effort has also been given to avoid erroneous sensor detection.

Although the descriptions above contain many specificities, these should not be construed as limiting the scope of the invention, but as merely providing illustrations of some of the presently preferred embodiments of this invention. For example, this invention could also be implemented in a revolver. Similar techniques would be used for a loaded chamber indicator on the revolver cylinder, and etcetera. Of course it is also possible for the firearm system to be used in conjunction with firearm electronic ignition systems.

While preferred embodiments of the present invention have been disclosed and described in detail, and various alternate embodiments have been described, it will be understood by those skilled in the art that various changes in form and detail may be made to the present invention without departing from the spirit and scope of the invention. Thus the scope of the invention should be determined by the appended claims and their legal equivalents, rather than by the examples given.

I claim:

1. A firearm system comprising of:
  (a) a firearm,
  (b) a microprocessor circuit,
  (c) a battery for powering said microprocessor circuit,
  (d) a non-volatile memory for storing a microprocessor program and firearm information,
  (e) a first sensing means to determine when the firearm action is closed, and a second sensing means to determine when the firearm action is open, and a microprocessor timing clock being able to measure the elapsed time between de-activation of the first sensing means and activation of the second sensing means, and conversely the elapsed time between de-activation of the second sensing means and activation of the first sensing means, whereby the firearm system can determine if the state of the firearm action is open or closed, and how fast the action was cycled in order to reach its current state, and whereby the firearm system can make determinations based on the state of the firearm action, and determinations based upon how fast the firearm action opens, closes, opens-and-closes, fails to close, or fails to open.

2. The firearm system of claim 1 further including a real-time-clock means whereby the microprocessor circuit can use the real-time-clock time and date information to time stamp and/or date stamp events as they are recorded into memory.

3. The firearm system of claim 1 further including a wireless communication means to facilitate communication between said firearm system and other devices and/or a command-and-control point.

4. The firearm system of claim 1 further including at least one of, or any combination of, the following arrangements:

(a) a third sensing means to detect the presence of a live round in the firearm chamber, and a fourth sensing means to determine when the firing pin impacts the live round, whereby the firearm system can determine when the firearm is discharged, (b) a fifth sensing means to start a second microprocessor timing clock upon detection of a bullet that begins to travel through a predetermined distance of the firearm barrel, a sixth sensing means to stop the second microprocessor timing clock upon detection that the bullet has completed its travel through the predetermined distance, whereby said microprocessor circuit is able to make calculations and determinations using said distance and time information, (c) a seventh sensing means to detect the presence of a live round in the firearm chamber, and as required; an eighth sensing means to detect if the firearm is cocked, and as required; a ninth sensing means to detect the status of a firearm manually operated safety, and as required; a tenth sensing means to detect the status of additional firearm safeties, whereby the firearm system can determine the go or no-go status of the firearm, or otherwise determine if the firearm will be discharged upon the firearm trigger being pressed, (d) an eleventh sensing means to measure the distance to a target, said eleventh sensing means being oriented in the same direction as the firearm, whereby the eleventh sensing means can measure the distance to the target that the firearm is pointed at, and display this measured information to the user, and/or use this information to calculate bullet trajectories, (e) an twelfth sensing means to detect the quantity of ammunition in a firearm magazine as is detectable by way of one or more firearm magazine light windows, said light windows exposing the location of a magazine follower and/or cartridges within said magazine, whereby the firearm system can use said eleventh sensing means to detect the location of said follower and/or cartridges, and therefore determine the number of cartridges in the magazine, (f) a firearm magazine including a follower in combination with electrical traces, said follower and electrical traces being located inside of said firearm magazine, said electrical traces being of differing lengths of which each length correlates to a position indexing of said follower, said follower being variably positioned with respect to the traces, said follower making contact with and completing the circuit between one or more of said electrical traces within said magazine as the follower progresses inside the magazine, whereby the firearm system can detect the location of the follower within the magazine, and can otherwise determine the number of cartridges in said magazine, (g) a data port means for communication between said firearm system and a computer and/or docking station, whereby the firearm system information can be displayed for user viewing and interaction, (h) a visual feedback means that provides an indication to the user of the ready status of the firearm, whereby the firearm system can communicate to the user the go or no-go status of the firearm, (i) an alphanumeric display means for visually communicating to the user the number of rounds remaining in the firearm, (j) an inputting means for inputting user commands and feedback into the firearm system whereby the user can interact with said firearm system, wherein the inputting means includes at least one of, or any combination of: a dial, a button, or a keypad (k) a display assembly means capable of communicating one or more pieces of information to the user, said display assembly further being integrated into the firearm whereby the user can conveniently view all firearm system information, (m) a data entry means by which the user can select or enter tabular trajectory data into the firearm system, whereby the firearm system can use the tabular data to interpolate and present trajectory compensations to the user, (n) a data entry means by which the user can select or enter mathematical constants into the firearm system to be acted upon by a trajectory algorithm, whereby the firearm system can use the results from said algorithm to determine and present trajectory compensations to the user, (o) a optical scope in combination with a electronic heads-up-display, said display enabling the firearm system information to be superimposed onto the scope optics, said combination including an adjustable reticle means whereby said reticle is either traditionally mechanical in nature, or is an integral part of the heads-up-display component, if the reticle is part of the heads-up-display, then the reticle may or may not be further automatically adjusted by the firearm system to make trajectory compensations, additionally said heads-up-display may or may not further include a supplemental aiming mark whereby the firearm system can indicate to the user the aiming point to be used for trajectory compensations, (p) a electronic scope including an image capturing means for acquiring the image that the scope is exposed to, in combination with a display means for visually conveying said acquired image to the user, said displaying means further allowing the firearm system information to be superimposed onto the acquired image, said combination including an adjustable reticle means whereby said reticle is an integral part of the firearm system information that is superimposed onto the acquired image, said reticle means may or may not be further automatically adjusted by the firearm system to make trajectory compensations, additionally said combination may (or may not) further include a supplemental aiming mark means, whereby the firearm system can indicate to the user the aiming point to be used for trajectory compensation, (q) a control outputting means, said control outputting means further including a energetic component that is activated by the microprocessor circuit; when activated, said energetic component will either engage a mechanical interference between one or more firearm components and therefore lock into position or disable or bind said firearm components, or disengage a mechanical interference between one or more firearm components and therefore free said firearm components, whereby the firearm system can control, lock, or release mechanical components on said firearm.

* * * * *